United States Patent
Murata et al.

(10) Patent No.: US 11,050,980 B2
(45) Date of Patent: Jun. 29, 2021

(54) RECORDING DEVICE, RECORDING METHOD, REPRODUCTION METHOD, AND PROGRAM

(71) Applicant: JVC KENWOOD Corporation, Yokohama (JP)

(72) Inventors: Toshitaka Murata, Yokohama (JP); Yasuo Yamada, Yokohama (JP); Keita Hayashi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/360,904

(22) Filed: Mar. 21, 2019

(65) Prior Publication Data

US 2019/0222809 A1   Jul. 18, 2019

Related U.S. Application Data

(63) Continuation of application No. PCT/JP2017/037642, filed on Oct. 18, 2017.

(30) Foreign Application Priority Data

| Nov. 18, 2016 | (JP) | JP2016-225129 |
| Nov. 18, 2016 | (JP) | JP2016-225130 |
| Mar. 3, 2017 | (JP) | JP2017-040029 |

(51) Int. Cl.
*H04N 7/18* (2006.01)
*H04N 5/765* (2006.01)
(Continued)

(52) U.S. Cl.
CPC ............... *H04N 7/188* (2013.01); *G07C 5/00* (2013.01); *G10L 25/48* (2013.01); *H04N 5/765* (2013.01);
(Continued)

(58) Field of Classification Search
None
See application file for complete search history.

(56) References Cited

U.S. PATENT DOCUMENTS

| 2010/0201819 A1* | 8/2010 | Minowa | G07C 5/0866 348/148 |
| 2012/0014659 A1* | 1/2012 | Hugosson | H04N 7/188 386/228 |

(Continued)

FOREIGN PATENT DOCUMENTS

| JP | 2011-205373 A | 10/2011 |
| JP | 2016-100672 A | 5/2016 |

*Primary Examiner* — Chikaodili E Anyikire
(74) *Attorney, Agent, or Firm* — Procopio, Cory, Hargreaves & Savitch LLP

(57) ABSTRACT

A recording device according to an embodiment includes an imaging data acquisition unit configured to acquire imaging data including video data and audio data, an event detection unit configured to detect occurrence of an event; and a recording control unit configured to record first imaging data including the video data and the audio data in a recording unit when recording of the imaging data in the recording unit is caused by the event detected by the event detection unit, and record second imaging data including the video data and not including the audio data in the recording unit when recording of the imaging data in the recording unit is not caused by the event.

7 Claims, 22 Drawing Sheets

(51) Int. Cl.
*G10L 25/48* (2013.01)
*H04N 9/802* (2006.01)
*H04N 5/91* (2006.01)
*G07C 5/00* (2006.01)
*H04N 5/77* (2006.01)
*G07C 5/08* (2006.01)
*G10L 25/78* (2013.01)

(52) U.S. Cl.
CPC ............... *H04N 5/772* (2013.01); *H04N 5/91* (2013.01); *H04N 7/18* (2013.01); *H04N 7/183* (2013.01); *H04N 9/802* (2013.01); *G07C 5/0866* (2013.01); *G10L 25/78* (2013.01)

(56) References Cited

U.S. PATENT DOCUMENTS

| | | | | |
|---|---|---|---|---|
| 2016/0006922 A1* | 1/2016 | Boudreau | ............... | G01S 7/022 |
| | | | | 348/207.1 |
| 2016/0163133 A1* | 6/2016 | Ricci | ................... | B60W 50/085 |
| | | | | 701/33.4 |

* cited by examiner

| SENSING | EVENT | EVENT LEVEL | TRANSMISSION DATA | |
|---|---|---|---|---|
| ACCELERATION SENSOR | COLLISION | HIGH | VIDEO + AUDIO | ACCELERATION INFORMATION |
| ACCELERATION SENSOR | SUDDEN ACCELERATION AND SUDDEN DECELERATION | LOW | VIDEO | ACCELERATION INFORMATION |
| USER OPERATION | ANY | LOW | VIDEO | |
| STEERING INFORMATION | SUDDEN STEERING | LOW | VIDEO | |
| SPEED INFORMATION | OVERSPEED | LOW | VIDEO | SPEED INFORMATION |
| VOLUME | HUMAN TROUBLE | HIGH | VIDEO + AUDIO | |

Fig. 21

RECORDING DEVICE, RECORDING METHOD, REPRODUCTION METHOD, AND PROGRAM

CROSS REFERENCE TO RELATED APPLICATION

This application is based upon and claims the benefit of priority from Japanese Patent Application No. 2016-225129 filed on Nov. 18, 2016; Japanese Patent Application No. 2016-225130 filed on Nov. 18, 2016; and Japanese Patent Application No. 2017-040029 filed on Mar. 3, 2017, the disclosures of which are incorporated herein in their entirety by reference.

BACKGROUND

The present disclosure relates to a recording device, a recording method, a reproduction method, and a program.

The number of vehicles equipped with a drive recorder has increased in recent years. A drive recorder is used as a recording device for recording imaging data by capturing situations inside or outside a vehicle. When a traffic accident happens, the data recorded in the drive recorder may be used in investigation of the cause of an accident. The drive recorder continues to constantly record imaging data which is captured with a camera or the like, for example, while the engine is running. As a result, when the data is fully recorded in a memory device up to its capacity, the drive recorder continues to record the new imaging data by overwriting it on the existing imaging data.

Patent Literature 1 (Japanese Unexamined Patent Application Publication No. 2016-100672) discloses a configuration of a recording device that prevents important imaging data at the moment of occurrence of an event such as an accident from being overwritten by imaging data at a normal time when such an event does not occur. Specifically, according to the recording device disclosed in Patent Literature 1, after the occurrence of an accident, if the vehicle is in a stopped state, then the recording is stopped and the overwriting on already recorded imaging data is prevented.

SUMMARY

The imaging data recorded by the recording device disclosed in Patent Literature 1 or a typical drive recorder (hereinafter referred to as "recording device and the like") includes image data and audio data. In addition, the recording device and the like continue to retain imaging data even when an engine of a vehicle is stopped. In addition, while one single driver uses a vehicle in some cases, multiple drivers or passengers may use the same vehicle in other cases. In such a case, content of the conversation or content of speeches of multiple users will be recorded in the recording device and the like, so that a certain user of the vehicle can eavesdrop on the content of the conversation or the content of the speeches of other users. This may cause the problem that the privacy of multiple users using the same vehicle cannot be maintained.

An embodiment provides a recording device, a recording method, and a program capable of retaining imaging data for identifying a cause of an accident on one hand and protecting privacy of users of a vehicle on the other hand.

A first aspect of the embodiment provides a recording device that includes an imaging data acquisition unit configured to acquire imaging data which includes video data and audio data, an event detection unit configured to detect occurrence of an event, and a recording control unit configured to process the imaging data as first imaging data which includes the video data and the audio data when processing on the imaging data is caused by the event that has been detected by the event detection unit, and process the imaging data as second imaging data which includes the video data but does not include the audio data when processing on the imaging data is not caused by the event.

A second aspect of the embodiment provides a recording method that includes acquiring imaging data which includes video data and audio data, detecting occurrence of an event, processing the imaging data as first imaging data including the video data and the audio data when processing on the imaging data is caused by the event that has been detected, and processing the imaging data as second imaging data including the video data and not including the audio data when processing on the imaging data is not caused by the event.

A third aspect of the embodiment provides a program that causes a computer to perform acquiring imaging data which includes video data and audio data, detecting occurrence of an event, processing the imaging data as first imaging data including the video data and the audio data when processing on the imaging data is caused by the event that has been detected, and processing the imaging data as second imaging data including the video data and not including the audio data when processing on the imaging data is not caused by the event.

BRIEF DESCRIPTION OF THE DRAWINGS

FIG. 21 is a diagram for explanation of content of an event detected by an event detection unit according to the eleventh embodiment.

DETAILED DESCRIPTION

First Embodiment

Figure 1:
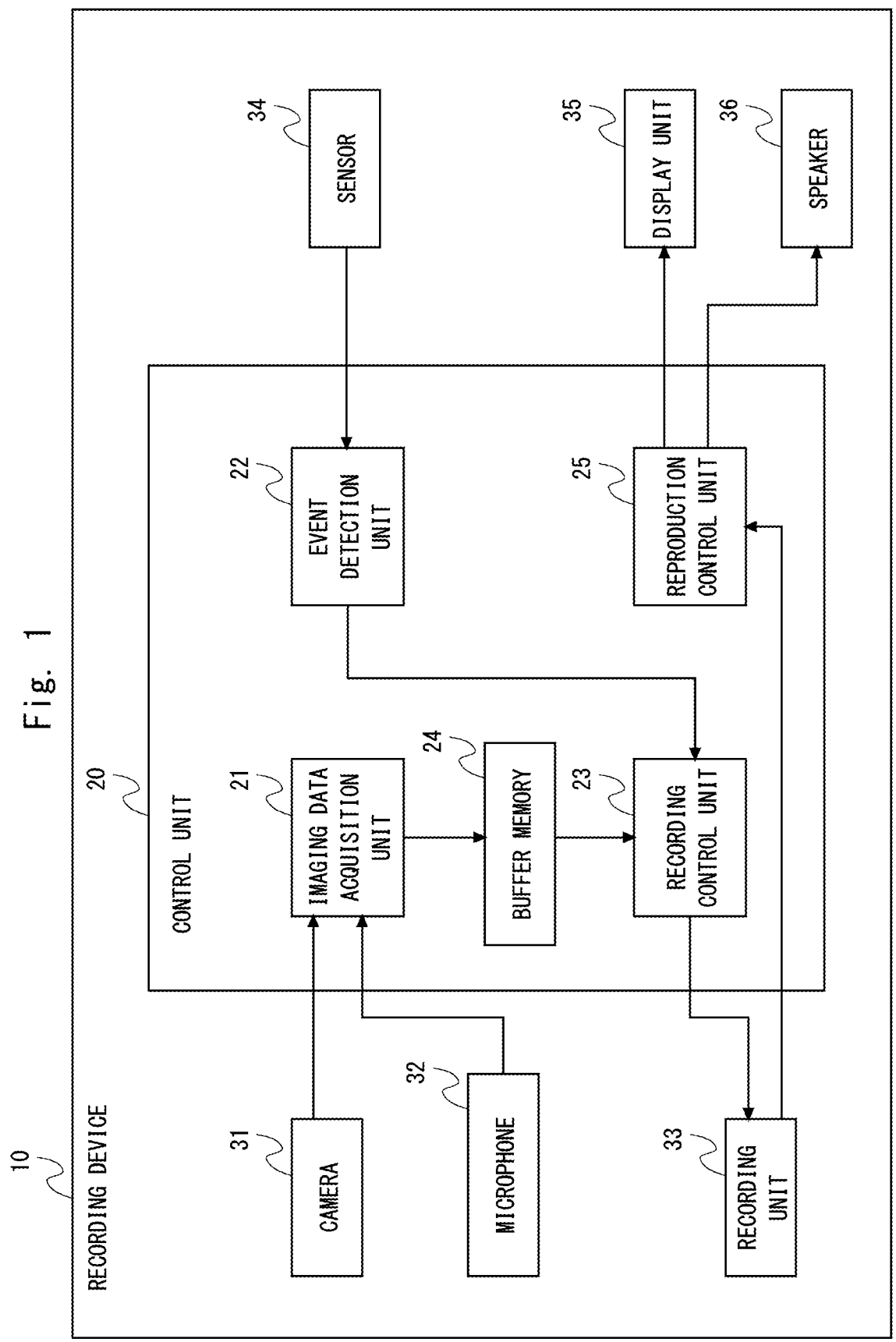
FIG. 1 is a configuration diagram of a recording device according to the first embodiment.

Embodiments of the present disclosure will be described hereinbelow with reference to drawings. An example of a configuration of a recording device 10 according to the first embodiment is described with reference to FIG. 1. The recording device 10 may be used, for example, as a drive recorder incorporated in a vehicle. The recording device 10 may be a computer device operated by its processor executing a program stored in its memory unit. The processor may be, for example, a microprocessor, a micro processing unit (MPU), or a central processing unit (CPU). The memory unit may be a volatile memory unit or a non-volatile memory unit, or may be configured by combination of a volatile memory unit and a non-volatile memory unit. The processor executes one or more programs including a set of instructions for causing the computer to perform algorithms which will be described hereinbelow with reference to the drawings. The recording device 10 has a control unit 20, a camera 31, a microphone 32, a recording unit 33, a sensor 34, a display unit 35, and a speaker 36. The control unit 20 may be directly connected to the camera 31, the microphone 32, the recording unit 33, the sensor 34, the display unit 35, and the speaker 36 using a predetermined cable or the like or may be connected thereto via a controller area network (CAN) which is an in-vehicle network. Also, the recording device 10 may be configured to include a constituent component or components realized by the control unit 20. Specifically, the recording device 10 includes an imaging data acquisition unit 21, an event detection unit 22, and a recording control unit 23.

The camera 31 is configured to generate video data imaging an inside of the vehicle or an outside of the vehicle. The microphone 32 is configured to collect sounds inside the vehicle or outside the vehicle to generate audio data. The recording unit 33, which may be a hard disk, a card-type memory device, and the like, is configured to record the video data and the audio data.

The sensor 34, which is, for example, an acceleration sensor, may be configured to detect an impact or the like generated when a vehicle incorporating the recording device 10 causes an accident or is involved in an accident. Further, the sensor 34 may be configured to detect a speed, etc. of the vehicle. The display unit 35 may be a display device that reproduces the video data recorded in the recording unit 33. The speaker 36 is configured to reproduce the audio data recorded in the recording unit 33. The speaker 36 includes an audio amplification unit and a sound processing unit (not shown) before the input of the speaker 36 and the speaker 36 includes these units when it is only indicated as "speaker 36."

Next, an example of the configuration of the control unit 20 will be described. The control unit 20 has an imaging data acquisition unit 21, an event detection unit 22, a recording control unit 23, a buffer memory 24, and a reproduction control unit 25. The individual constituent components such as the imaging data acquisition unit 21, the event detection unit 22, the recording control unit 23, and the reproduction control unit 25 constituting the control unit 20 may be a software component or module whose processing is carried out by the processor executing the program stored in the memory unit. Alternatively, the individual constituent components constituting the control unit 20 may be a hardware component such as a circuit, a chip, and the like.

The imaging data acquisition unit 21 is configured to acquire the video data generated by the camera 31 and the audio data generated by the microphone 32. The data including the video data and the audio data may be called "imaging data." In other words, the imaging data acquisition unit 21 is configured to acquire the imaging data from the camera 31 and the microphone 32. The video data may be generated using schemes such as H.264 and H.265. Also, the audio data may be generated using a pulse code modulation (PCM) scheme or the like, and the imaging data which is moving image data including the video data and the audio data may be generated using MPEG (Moving Picture Experts Group) 2-TS (Transport Stream), AVI (Audio Video Interleave), or the like.

The imaging data acquisition unit 21 is configured to output the imaging data including the video data and the audio data to the buffer memory 24. The buffer memory 24 is configured to temporarily store the output imaging data. The buffer memory 24 may be called a built-in memory unit incorporated in the control unit 20. To store temporarily in this context may mean, for example, that the buffer memory 24 erases the imaging data after a lapse of a predetermined period. Alternatively, the temporary storing may mean storing data output from the imaging data acquisition unit 21 by overwriting it upon the data in the buffer memory 24. Alternatively, the temporary storing may mean that the buffer memory 24 erases the imaging data that has been output from the imaging data acquisition unit 21 when the buffer memory 24 output the imaging data to the recording control unit 23.

The event detection unit 22 is configured to detect occurrence of an event using information output from the sensor 34. For example, when an impact level detected by the sensor 34 operating as an acceleration sensor exceeds a predetermined value, then the event detection unit 22 detects the occurrence of an event "traffic accident." The impact level exceeding the predetermined level may be rephrased as an acceleration exceeding a predetermined value. The event detection unit 22, upon detection of the occurrence of the event, outputs the information indicative of the occurrence of the event to the recording control unit 23. The information indicative of the occurrence of the event may include the time point at which the event occurred. Further, the information indicative of the occurrence of the event may include the content of the event that occurred.

The recording control unit 23 is configured to record the imaging data stored in the buffer memory 24 in the recording unit 33 in a file format. The recording control unit 23 records the imaging data acquired from the buffer memory 24 in the recording unit 33 when recording of the imaging data stored in the buffer memory 24 into the recording unit 33 is caused by the event that has been detected by the event detection unit 22. The imaging data acquired from the buffer memory 24 includes the video data and the audio data. In other words, the recording control unit 23 is configured to migrate the imaging data from the buffer memory 24 to the recording unit 33. When recording of the imaging data stored in the buffer memory 24 into the recording unit 33 is caused by the event that has been detected by the event detection unit 22, the recording control unit 23 records the imaging data acquired from the buffer memory 24 on an as-is basis in the recording unit 33. Specifically, the recording control unit 23 generates a moving image file including video data and audio data from the imaging data stored in the buffer memory 24 and records the moving image file in the recording unit 33.

The recording control unit 23 records the piece of data that only includes the video data into the recording unit 33 from among the pieces of imaging data acquired from the buffer memory 24 when recording of the imaging data stored in the buffer memory 24 into the recording unit 33 is not caused by the event that has been detected by the event detection unit 22. That is, the recording control unit 23 records, in the recording unit 33, the imaging data that includes the video data but does not include the audio data. In other words, recording control unit 23 records data obtained by erasing audio data from the imaging data from the buffer memory 24 into the recording unit 33. Specifically, the recording control unit 23 replaces the audio data in the imaging data stored in the buffer memory 24 by soundless audio data, generates the moving image file by the soundless audio data and the video data, and records the moving image file in the recording unit 33.

When the imaging data including the video data and the audio data is recorded in the recording unit 33, the recording control unit 23 may record imaging data caused by an event, i.e., the imaging data including the video data and the audio data into the recording unit 33 as overwrite-prohibited data. For example, the recording control unit 23 may designate an address in a memory area where overwriting of data is prohibited in the recording unit 33 to record the imaging data in the recording unit 33. Alternatively, recording control unit 23 may specify flag information or the like prohibiting overwriting in the header or payload of the imaging data.

Also, when the recording control unit 23 records the imaging data that is not caused by an event, i.e., imaging data from which the audio data is erased so that it only includes the video data, into the recording unit 33, then the recording control unit 23 may record the imaging data that only includes the video data into the recording unit 33 as overwritable data. For example, the recording control unit 23 may designate an address in the memory area where overwriting of data is allowed in the recording unit 33 and record the imaging data into the recording unit 33. Alternatively, the recording control unit 23 may specify flag information indicating that overwriting is allowed in the header or payload of the imaging data.

The recording unit 33 records the data that has been output from the recording control unit 23, in other words, data that has been migrated via the recording control unit 23 from the buffer memory 24.

The reproduction control unit 25 is configured to acquire the imaging data recorded in the recording unit 33 and output the video data based on the acquired imaging data to the display unit 35, and output the audio data based on the acquired imaging data to the speaker 36, etc.

While FIG. 1 illustrates a configuration in which the recording device 10 includes the reproduction control unit 25, the display unit 35, and the speaker 36, a reproduction device or the like different from the recording device 10 may include the reproduction control unit 25, the display unit 35, and the speaker 36. In other words, the recording device 10 may not include the reproduction control unit 25, the display unit 35, or the speaker 36. That is, a reproduction device or the like that includes the reproduction control unit 25, the display unit 35, and the speaker 36 may reproduce the data recorded in the recording unit 33 of the recording device 10. For example, the reproduction device or the like may be a device that reproduces data recorded in a portable recording medium such as an optical disc and card-type recording medium. The data recorded in the recording unit 33 may be migrated to the portable recording medium.

Figure 2:
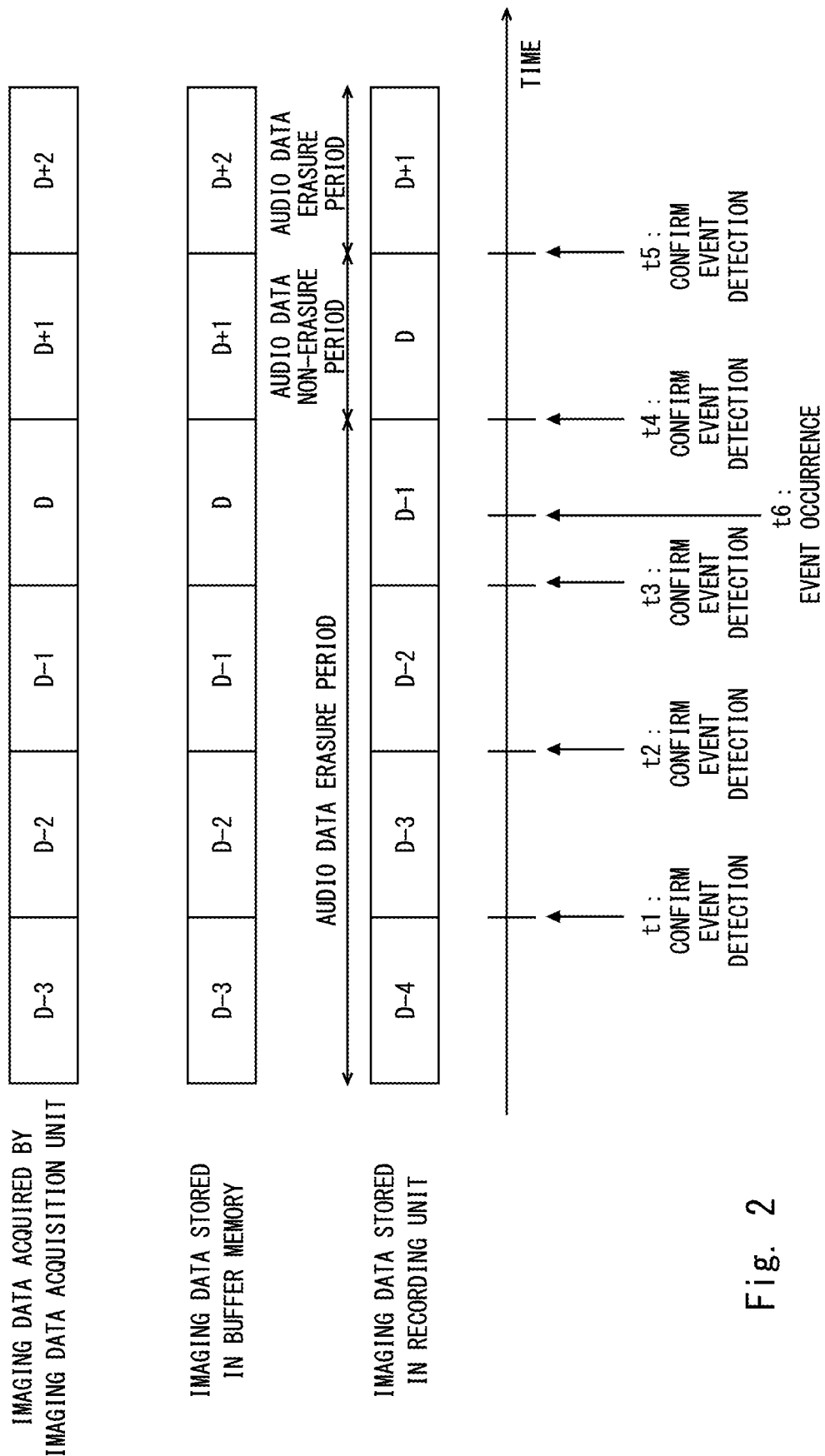
FIG. 2 is a diagram illustrating a relationship between data recorded in a recording unit and data recorded in a buffer memory according to the first embodiment.

Here, the relationship between the data recorded in the recording unit 33 and the data recorded in the buffer memory 24 is described with reference to FIG. 2. The horizontal axis illustrated in FIG. 2 indicates the passage of time. Each of D−4 to D+2 indicates a piece of imaging data captured during a predetermined period. In FIG. 2, D−4 is the piece of imaging data captured least recently and D+2 is a piece of imaging data captured most recently. The predetermined period may be, for example, several seconds, several tens of seconds, several minutes, and the like.

The imaging data acquired by the imaging data acquisition unit 21 is immediately output to the buffer memory 24. As a result, FIG. 2 illustrates a configuration in which the imaging data acquired by the imaging data acquisition unit 21 is stored on an as-is basis in the buffer memory 24. In other words, FIG. 2 illustrates a state where the particular point of time at which the imaging data acquisition unit 21 acquired the imaging data is substantially in agreement with the particular point of time at which the imaging data was stored in the buffer memory 24. The substantial agreement in this context may also include a case where the particular point of time at which the imaging data acquisition unit 21 acquired the imaging data is not completely in agreement with the particular point of time at which the imaging data is stored in the buffer memory 24. For example, the substantial agreement may encompass a case where the particular point of time at which the imaging data is stored in the buffer memory 24 may be delayed relative to the particular point of time at which the imaging data acquisition unit 21 acquired the imaging data. Meanwhile, the imaging data recorded in the recording unit 33 is temporarily stored in the buffer memory 24 and subsequently recorded in the recording unit 33 by the recording control unit 23. As a result, the particular point of time at which the imaging data acquired by the imaging data acquisition unit 21 is stored in the buffer memory 24 is different from the particular point of time at which it is recorded in the recording unit 33. Specifically, the particular point of time at which the imaging data is recorded in the recording unit 33 is later than the particular point of time at which the imaging data is stored in the buffer memory 24.

t1 to t6 indicate the time. The recording control unit 23 determines whether or not an event occurred in the past predetermined periods at the time t1 to the time t6. For example, the recording control unit 23 determines, at the time t2, whether or not an event occurred in the period from the time t1 to the time t2. The recording control unit 23 likewise determines, at other time points, whether or not an event occurred. In FIG. 2, the recording control unit 23 determines, at the time t1 to the time t3 and at the time t5, that no event has occurred. Also, the recording control unit 23 at the time t4 determines that an event has occurred at the time t6 between the time t3 and the time t4.

For example, when the recording control unit 23 determines at the time t2 that no event has occurred in the period from the time t1 to the time t2, then the recording control unit 23 erases the audio data from the imaging data D-2 stored in the buffer memory 24, that is, makes the audio data soundless in the imaging data D-2, converts the imaging data which now includes only the video data into a file and records the file in the recording unit 33. Meanwhile, the recording control unit 23 determined at the time t4 that an event occurred at the time t6 in the period from the time t3 to the time t4. In this case, the recording control unit 23 at the time t6 converts the data D stored in the buffer memory 24 into a file on an as-is basis without erasing audio data from the data D acquired by the imaging data acquisition unit 21 and records the file in the recording unit 33.

While FIG. 2 illustrates a state where the imaging data storing of which is completed to the buffer memory 24 is instantaneously recorded in the recording unit 33, the particular point of time at which the imaging data recorded in the buffer memory 24 is recorded into the recording unit 33 is not limited to the one illustrated in FIG. 2. For example, the recording control unit 23 may acquire the imaging data that is being stored into the buffer memory 24 and record the acquired imaging data into the recording unit 33. Alternatively, when storing of the imaging data into the buffer memory 24 has been completed, the recording control unit 23 may record the same imaging data into the recording unit 33 after a lapse of a predetermined period after the time point at which the storing of the imaging data was completed. Here, it is intended that the imaging data corresponds to any one of D-4 to D+2 illustrated in FIG. 2.

Also, FIG. 2 illustrates a state where the recording control unit 23 records only the imaging data acquired by the imaging data acquisition unit 21 in a period including the time point at which the event occurred into the recording unit 33 without erasing the audio data. The recording control unit 23 is not limited to this and, for example, may record a piece of imaging data acquired by the imaging data acquisition unit 21 in a period prior to the period including the time point at which the event occurred without erasing the audio data into the recording unit 33 in addition to the imaging data acquired by the imaging data acquisition unit 21 in a period including the time point at which the event occurred. For example, the recording control unit 23 may record, at the time t6, data D-1 without erasing audio data into the recording unit 33 in addition to the data D acquired by the imaging data acquisition unit 21.

Also, even in a case where the recording control unit 23 determines that no event has occurred, the recording control unit 23 may record in the recording unit 33 the imaging data acquired in a period prior to the latest period with its audio data erased in addition to the imaging data acquired in the latest period stored in the buffer memory 24.

In FIG. 2, the period in which data D-4 to data D-1 are recorded in the recording unit 33 and the period in which data D+1 is recorded are defined as audio data erasure period and the period in which data D is recorded in the recording unit 33 is defined as an audio data non-erasure period.

Next, the flow of the recording processing to record the imaging data according to the first embodiment will be described with reference to FIG. 3. First, the imaging data acquisition unit 21 outputs the imaging data including the video data and the audio data to the buffer memory 24 and the buffer memory 24 starts storing of the imaging data (S11). Next, the recording control unit 23 determines whether or not an event occurred when it starts the recording of the imaging data stored in the buffer memory 24 into the recording unit 33 (S12). Specifically, the recording control unit 23 determines whether or not an event occurred in the period of imaging of the imaging data to be migrated. For example, the recording control unit 23 determines whether or not occurrence of an event was detected by the event detection unit 22 in the period of imaging of the imaging data to be migrated.

When the recording control unit 23 determines that an event has occurred, the recording control unit 23 records the imaging data including the particular point of time at which the event occurred in the imaging period into the recording unit 33 (S13). The imaging data recorded in the step S13 is a moving image file that includes video data and audio data. In other words, the recording control unit 23 converts the imaging data into a file without erasing audio data from the image data stored in the buffer memory 24 and records the imaging data in the recording unit 33.

When the recording control unit 23 determines that no event has occurred, then the recording control unit 23 erases audio data from the imaging data imaged in the period in which no event has occurred and records the imaging data that only includes the video data into the recording unit 33 (S14). The imaging data recorded in the step S14 is a moving image file that includes video data and audio data that has been made soundless. In other words, the recording control unit 23 erases audio data from the imaging data stored in the buffer memory 24 and converts it into a file, and records the imaging data in the recording unit 33.

The recording control unit 23, after having recorded the image data stored in the buffer memory 24 in the recording unit 33 in the step S13 or S14, determines whether or not image data that is not recorded in the recording unit 33 exists in the buffer memory 24 (S15).

When the recording control unit 23 determines that no imaging data that is not recorded in the recording unit 33 exists in the buffer memory 24, then the recording control unit 23 terminates the processing. The case where no imaging data that is not recorded in the recording unit 33 exists in the buffer memory 24 may include, for example, a case where a driver performed an operation to stop the imaging, a case where the engine has stopped and the imaging has been stopped, and other cases.

When the recording control unit 23 determines that imaging data that is not recorded in the recording unit 33 exists in the buffer memory 24, the recording control unit 23 repeatedly carries out the processing steps of the step S12 and the subsequent steps.

As described in the foregoing, the recording device 10 according to the first embodiment can record video data and audio data in the recording unit 33 for the imaging data whose imaging period includes the particular point of time at which the event occurred. Also, with regard to the imaging data imaged in a period in which no event has occurred, the recording device 10 can record only the video data in the recording unit 33 with the audio data erased from the imaging data. By virtue of this, the recording device 10 makes it possible for the imaging data at the time of occurrence of an event such as a traffic accident to contribute to identification of the cause of the accident because the imaging data includes the video data and the audio data. On the other hand, the recording device 10 erases audio data that may include speeches of the driver or conversations between the driver and a passenger and the like from the imaging data in the period in which no event has occurred and thus can protect the privacy of the driver and the passenger.

Further, since the recording device 10 erases audio data from the imaging data in a period in which no event has occurred to record the imaging data in the recording unit 33, it is made possible to reduce the amount of data to be recorded when compared with a case where imaging data that includes the audio data is to be recorded. By virtue of this, it is made possible to reduce the number of times of overwriting and recording of the imaging data in the recording unit 33, so that the recording unit 33 can record imaging data in a longer period.

Second Embodiment

Next, an example of a configuration of a recording device 40 according to the second embodiment will be described with reference to FIG. 4. The recording device 40 has a control unit 41 instead of the control unit 20 of the recording device 10 in FIG. 1. Also, the control unit 41 has a configuration in which a volume level acquisition unit 42 is added to the control unit 20 of FIG. 1. With regard to the recording device 40, the same reference sings are given to the same features as those of the recording device 10 and detailed explanations thereof will not be repeated. The following explanations focus on the features of the recording device 40 different from those of the recording device 10. The recording device 40 may be configured to include constituent components realized by the control unit 41 in the same manner as the recording device 10. Specifically, the recording device 40 includes the imaging data acquisition unit 21, the event detection unit 22, the recording control unit 23, and the volume level acquisition unit 42.

The volume level acquisition unit 42 is configured to acquire information on a volume level from the audio data generated by the microphone 32. The volume level acquisition unit 42 may acquire the information on the volume level from the audio data acquired by the imaging data acquisition unit 21. The volume level may for example be information indicative of a volume of a sound. The volume level acquisition unit 42 outputs the information on the volume level to the recording control unit 23. Specifically, the information on the volume level may include identification information to identify the audio data.

Figure 4:
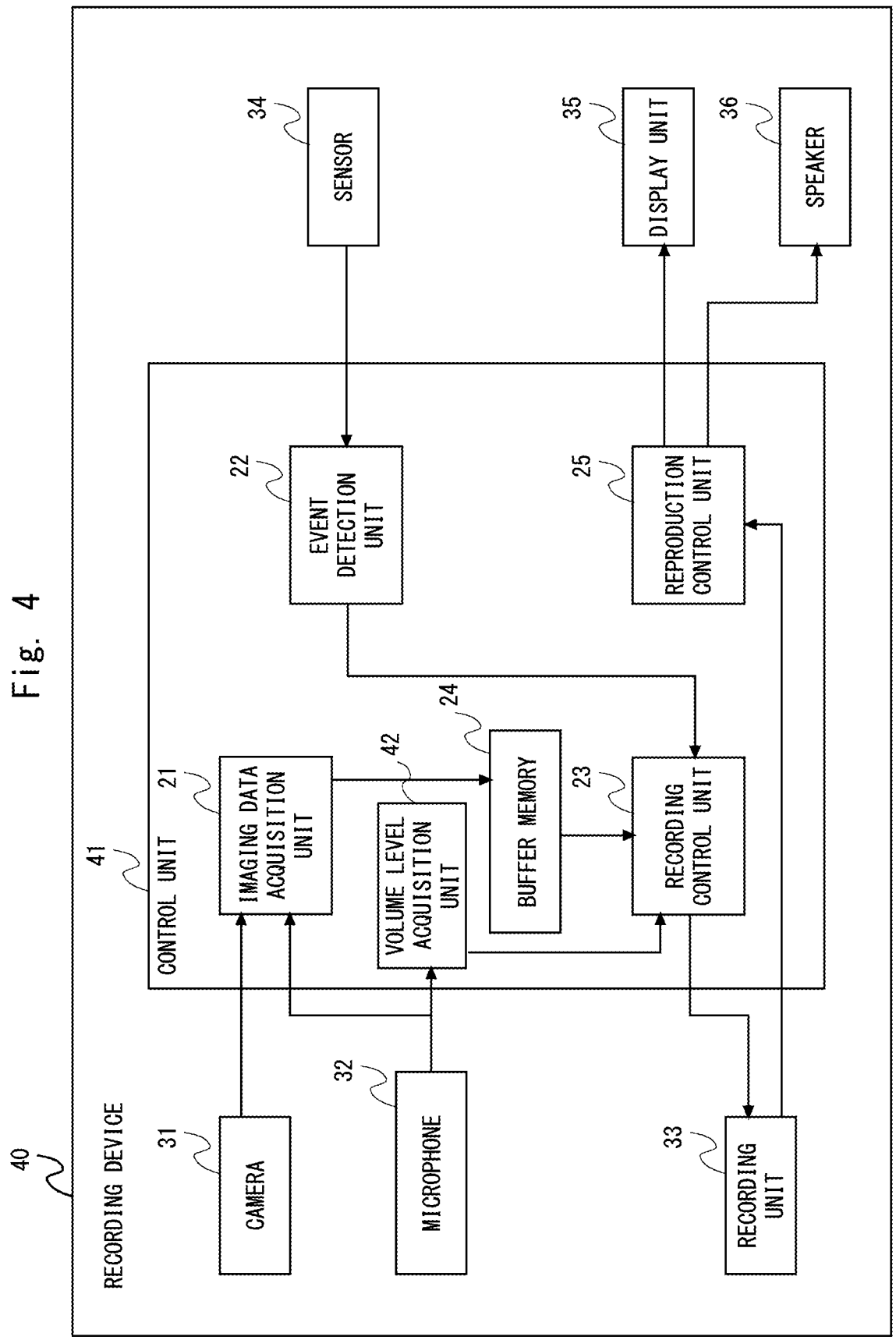
FIG. 4 is a configuration diagram of a recording device according to the second embodiment.

While FIG. 4 illustrates a configuration in which the volume level acquisition unit 42 is arranged between the microphone 32 and the recording control unit 23, the volume level acquisition unit 42 may be arranged between the imaging data acquisition unit 21 and the recording control unit 23.

When recording of the imaging data stored in the buffer memory 24 into the recording unit 33 is not caused by the event that has been detected by the event detection unit 22, the recording control unit 23 determines whether or not the audio data should be erased from the imaging data in accordance with the volume level regarding the audio data. For example, a threshold 1 for the volume level is defined between the volume at a level of normal conversation and a loud voice above the level of normal conversation. That is, the threshold 1 is used to identify a normal conversation level and a volume level above the normal conversation level. The loud voice above the level of normal conversation may be, for example, a human scream or shouting voice, etc.

If the volume level is lower than the threshold 1, the recording control unit 23 erases the audio data from the imaging data and records only the video data in the recording unit 33. Also, if the sound level exceeds the threshold 1, the recording control unit 23 records the imaging data in the recording unit 33 without erasing the audio data even when no event has been detected by the event detection unit 22.

Since the recording control unit 23 uses the threshold 1 to determine whether or not the audio data should be erased from the imaging data, it is made possible to protect privacy of the driver or the passenger. Further, in a case where it is expected that a certain abnormality has occurred in the vehicle considering the detection of the loud voice above the level of normal conversation although no event is detected by the sensor 34, or in other similar cases, imaging data including the audio data can be recorded in the recording unit 33.

Also, a threshold 2 for the volume level may be defined between the volume at a level of normal conversation and a volume lower than the normal conversation level. That is, the threshold 2 is used to identify the normal conversation level and a volume level lower than that. The volume lower than the normal conversation level may be, for example, silence or mechanical sound and the like.

If the volume level exceeds the threshold 2, the recording control unit 23 erases the audio data from the imaging data and records only the video data in the recording unit 33. Also, if the volume level is lower than the threshold 2, the recording control unit 23 records the imaging data in the recording unit 33 without erasing the audio data even when occurrence of any event has not been detected by the event detection unit 22.

Since the recording control unit 23 uses the threshold 2 to determine whether or not the audio data should be erased from the imaging data, it is made possible to protect privacy of the driver or the passenger. Further, if the sound level corresponds to a sound level that would not reveal the privacy of the driver and the passenger, the imaging data stored in the buffer memory 24 is recorded on an as-is basis in the recording unit 33 without erasure of the audio data, and thereby the processing load in the recording control unit 23 can be suppressed.

Also, the recording control unit 23 may use the thresholds 1 and 2 to determine whether or not the audio data should be erased from the imaging data. For example, the recording control unit 23 records the imaging data in the recording unit 33 without erasing the audio data both in the case where the volume level exceeds the threshold 1 and, in the case where it is lower than the threshold 2. Also, the recording control unit 23 records the imaging data with its audio data erased in the recording unit 33 in a case where the volume level is lower than the threshold 1 and exceeds the threshold 2.

Next, the flow of the recording processing to record the imaging data according to the second embodiment will be described with reference to FIG. 5. Since the steps S21 to S25 are the same as or similar to the steps S11 to S15 of FIG. 3, detailed explanations thereof are not repeated here.

When the recording control unit 23 determines in the step S22 that no event has occurred, the recording control unit 23 further determines whether or not the volume level of the audio data included in the imaging data is lower than a predetermined value, e.g., the threshold 1 (S26). When the recording control unit 23 determines that the volume level exceeds the threshold 1, the recording control unit 23 records, in the recording unit 33, the imaging data stored in the buffer memory 24 without erasing the audio data from the imaging data (S23). When the recording control unit 23 determines that the volume level is lower than the threshold 1, the recording control unit 23 records, in the recording unit 33, the imaging data stored in the buffer memory 24 with the audio data erased from the imaging data (S24).

Figure 5:
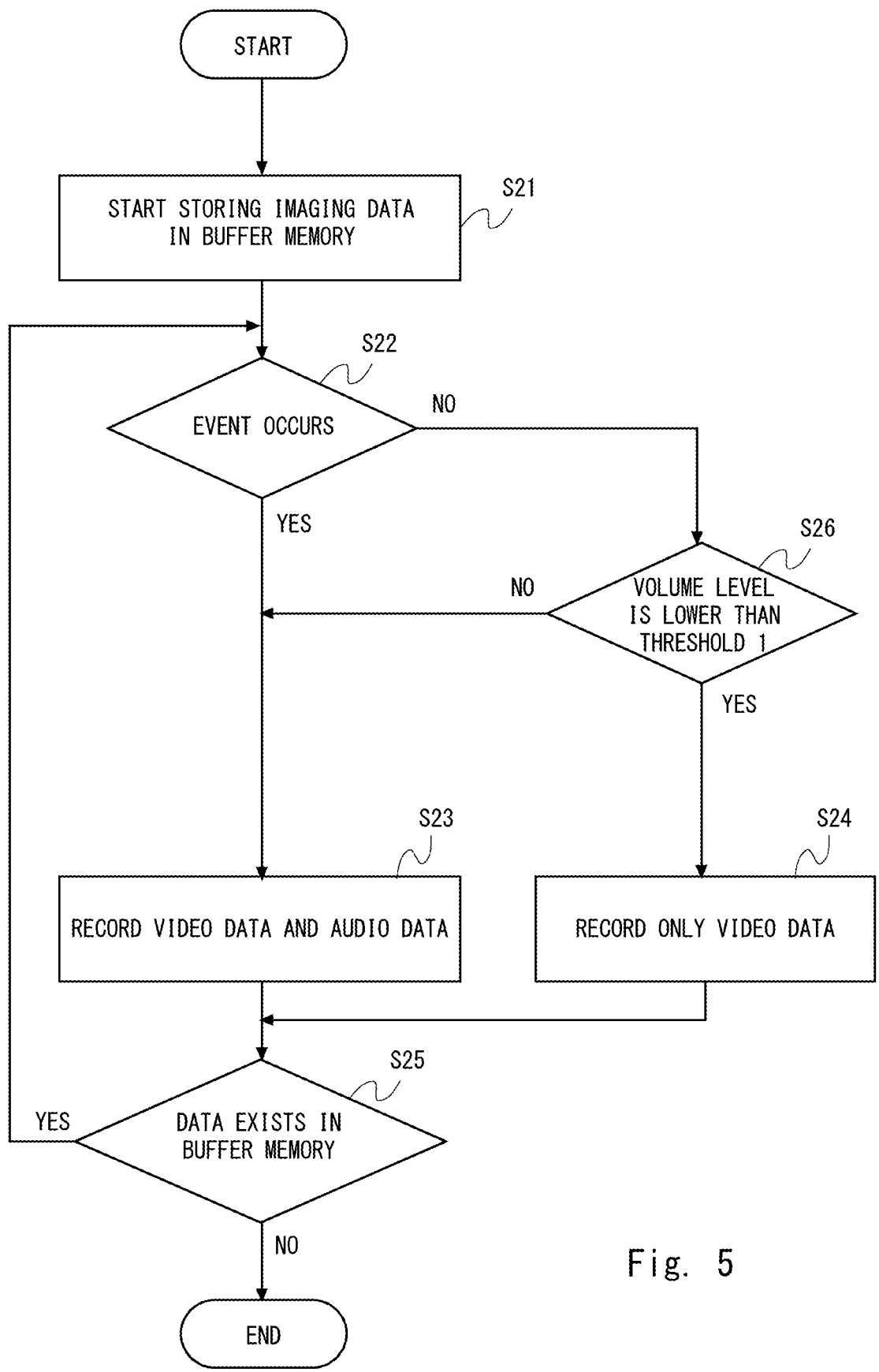
FIG. 5 is a diagram illustrating a flow of recording processing to record imaging data according to the second embodiment.

While FIG. 5 illustrates processing where the recording control unit 23 determines in the step S26 whether or not the volume level is lower than the threshold 1, the processing for determining whether or not the volume level is lower than the threshold 2 may be carried out. In this case, when the volume level is lower than the threshold 2, the recording control unit 23 performs the processing at the step S23, and performs the processing at the step S24 if the volume level exceeds the threshold 2.

Also, the recording control unit 23 may determine whether or not the volume level is lower than the threshold 1 and exceeds the threshold 2. In this case, if the volume level is lower than the threshold 1 and exceeds the threshold 2, the recording control unit 23 performs the processing at the step S24 and performs the processing at the step S23 if the condition that the volume level be lower than the threshold 1 and exceeds the threshold 2 is not satisfied.

As described in the foregoing, by using the recording device 40 according to the second embodiment, it is made possible to determine whether or not the audio data should be erased from the imaging data in accordance with the volume level. By virtue of this, the recording device 40 can estimate that an abnormality has occurred in the vehicle and record the imaging data including the audio data into the recording unit 33 even when the event detection unit 22 cannot detect an event. Also, even in cases where an event has been detected, depending on the status of the conversations in the vehicle, it is possible to create a record that does not include the audio data, and thus privacy can be ensured.

Third Embodiment

Next, an example of a configuration of a recording device 50 according to the third embodiment will be described with reference to FIG. 6. The recording device 50 includes a control unit 51 instead of the control unit 20 in the recording device 10 of FIG. 1. Also, the control unit 51 has a configuration in which a speech analysis unit 52 is added to the control unit 20 of FIG. 1. The same reference signs are given to the same features of the recording device 50 as those of the recording device 10, and detailed explanations thereof will not be repeated. The following explanations focus on the features of the recording device 50 different from those of the recording device 10. The recording device 50 may be configured to include the constituent components realized by the control unit 51 in the same or similar manner as in the recording device 10. Specifically, the recording device 50 includes the imaging data acquisition unit 21, the event detection unit 22, the recording control unit 23, and the speech analysis unit 52.

The speech analysis unit 52 is configured to determine whether or not the audio data generated by the microphone 32 includes speech. The speech analysis unit 52 may determine whether or not the audio data acquired by the imaging data acquisition unit 21 includes speech. Speech includes driver's soliloquy, conversations between a driver and a passenger, etc. The speech analysis unit 52 performs voice recognition processing on the audio data acquired by the imaging data acquisition unit 21 to detect a sound including a speech component, and thereby determines whether or not speech is included. The voice recognition processing may be performed using existing voice recognition processing and, for example, a phoneme is extracted from the audio data based on an acoustic model and comparing the extracted phoneme with a linguistic model to determine whether or not it is a speech component. Sounds other than speech include, for example, a mechanical sound, noise outside the vehicle, etc. The speech analysis unit 52 outputs, along with the audio data, information indicative of whether or not speech is included in the audio data to the buffer memory 24. Specifically, the information indicative of whether or not speech is included therein may include identification information for identifying the audio data. Alternatively, the audio data may include information indicative of whether or not speech is included.

Figure 6:
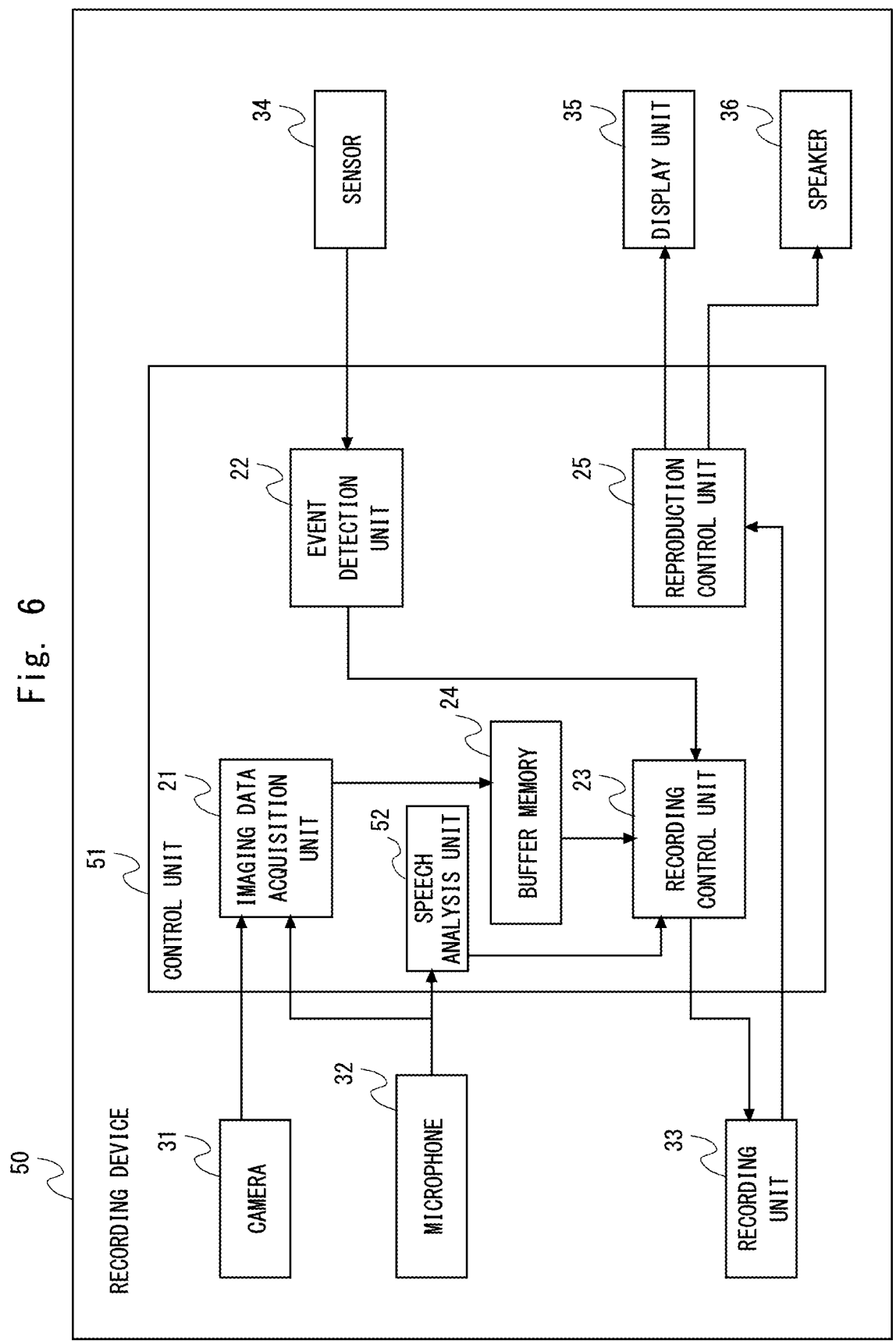
FIG. 6 is a configuration diagram of a recording device according to the third embodiment.

While FIG. 6 illustrates a configuration in which the speech analysis unit 52 is arranged between the microphone 32 and the recording control unit 23, the speech analysis unit 52 may be arranged between the imaging data acquisition unit 21 and the recording control unit 23.

When recording of the imaging data stored in the buffer memory 24 into the recording unit 33 is not caused by the event that has been detected by the event detection unit 22, the recording control unit 23 determines whether or not the audio data should be erased from the imaging data in accordance with whether or not the audio data includes speech.

If the audio data includes speech, the recording control unit 23 erases the audio data from the imaging data and outputs only the video data to the recording unit 33. Also, if the audio data does not include speech, the recording control unit 23 records the imaging data in the recording unit 33 without erasing the audio data even when occurrence of an event is not detected by the event detection unit 22.

Figure 7:
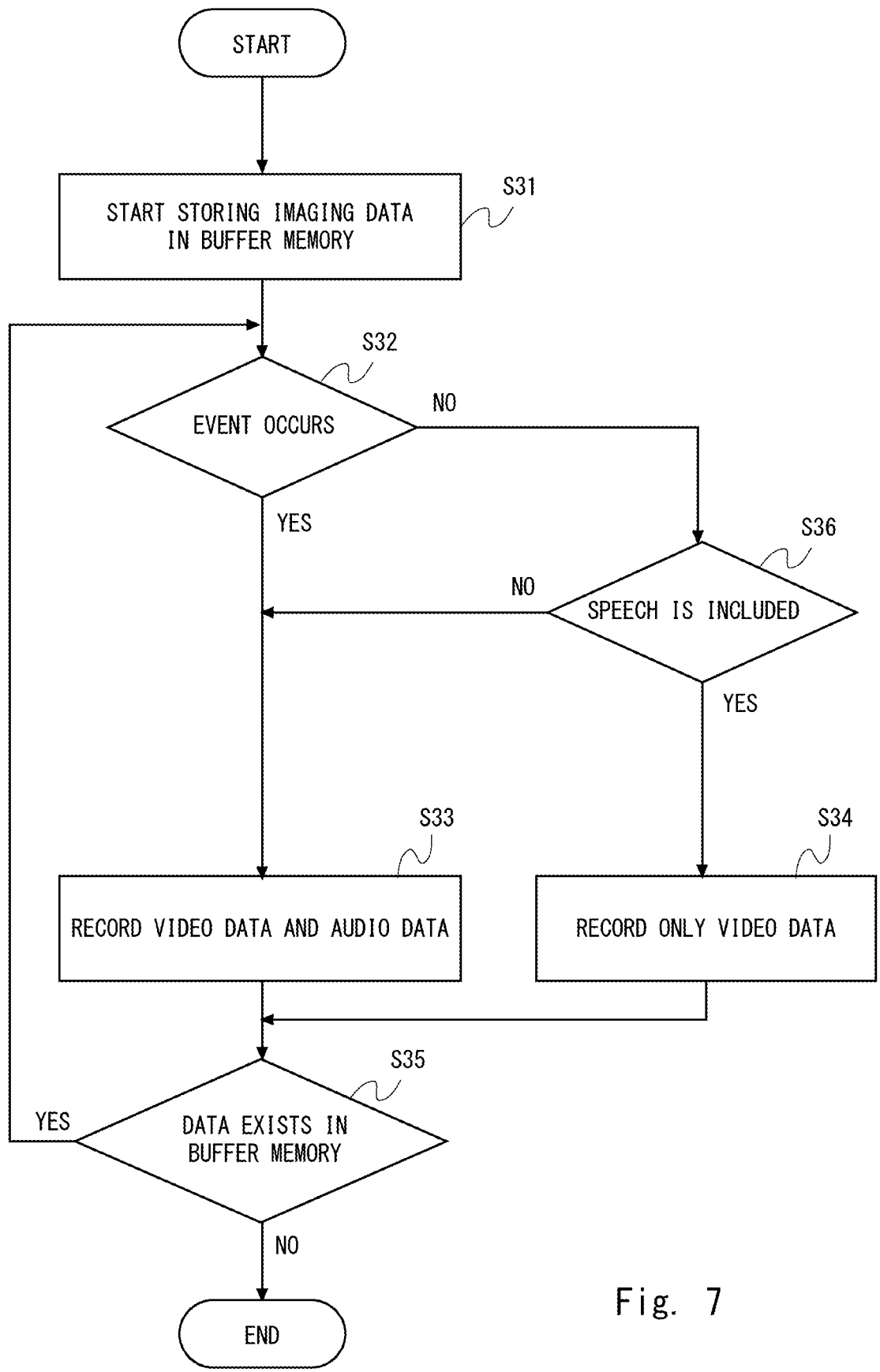
FIG. 7 is a diagram illustrating a flow of recording processing to record imaging data according to the third embodiment.

Next, the flow of recording processing to record the imaging data according to the third embodiment will be described with reference to FIG. 7. Since the steps S31 to S35 are the same as or similar to the steps S11 to S15 of FIG. 3, detailed explanations thereof will not be repeated.

When the recording control unit 23 determines in the step S32 that no event has occurred, the recording control unit 23 further determines whether or not speech is included in the audio data included in the imaging data (S36). When the recording control unit 23 determines that no speech is included, the recording control unit 23 records, in the recording unit 33, the imaging data stored in the buffer memory 24 without erasing the audio data from the imaging data (S33). When the recording control unit 23 determines that speech is included therein, the recording control unit 23 records, in the recording unit 33, the imaging data stored in the buffer memory 24 with the audio data erased from the imaging data (S34).

As described in the foregoing, by using the recording device 50 according to the third embodiment, whether or not speech is included in the audio data can be determined. By virtue of this, the recording device 50 can erase the audio data composed of speech, erasure of which is most necessary in terms of protection of privacy.

Fourth Embodiment

Figure 8:
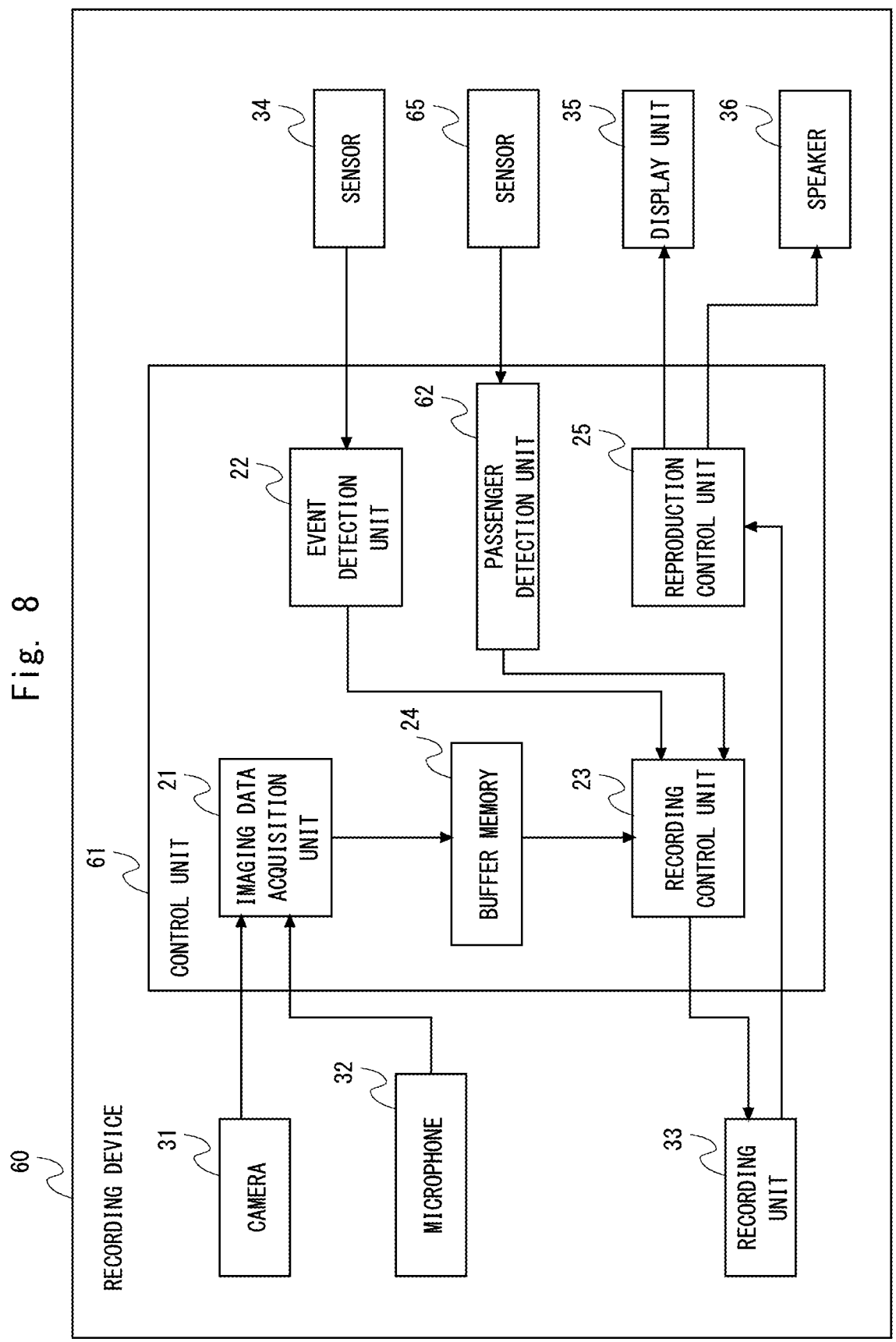
FIG. 8 is a configuration diagram of a recording device according to the fourth embodiment.

Next, an example of a configuration of a recording device 60 according to the fourth embodiment will be described with reference to FIG. 8. The recording device 60 includes a control unit 61 instead of the control unit 20 in the recording device 10 of FIG. 1. Further, the recording device 60 has a sensor 65. Also, the control unit 61 has a configuration in which a passenger detection unit 62 is added to the control unit 20 of FIG. 1. The same reference signs are given to the same features of the recording device 60 as those of the recording device 10, and detailed explanations thereof will not be repeated. The following explanations focus on the features of the recording device 60 different from those of the recording device 10. The recording device 60 may be configured to include the constituent components realized by the control unit 61 in the same or similar manner as in the recording device 10. Specifically, the recording device 60 includes the imaging data acquisition unit 21, the event detection unit 22, the recording control unit 23, and the passenger detection unit 62.

The sensor 65 is used to detect presence or absence of a passenger other than the driver in the vehicle incorporating the recording device 60. The sensor 65 may be a sensor configured to detect, for example, weight. The sensor 65 may be configured to detect the weight of the passenger when the passenger is seated on a seat other than the driver's seat. Alternatively, the sensor 65 may be a sensor configured to detect fastening of the seat belt or a sensor configured to detect opening or closing of a door or doors other than that of the driver's seat.

When the sensor 65 has detected the presence of a passenger by the weight of the seat other than the driver's seat, opening and closing of the door other than that of the driver's seat, or any other similar event, then the sensor 65 outputs the result of the detection to the passenger detection unit 62. The sensor 65 may be directly connected using a predetermined cable or connected via a CAN network which is an in-vehicle network.

When the passenger detection unit 62 has received the result of the detection from the sensor 65, the passenger detection unit 62 outputs the information indicative of the presence of a passenger other than the driver in the vehicle incorporating the recording device 60 to the recording control unit 23. The passenger detection unit 62, after having detected the presence of the passenger, may output the information indicative of the presence of the passenger on a periodical basis to the recording control unit 23 while the passenger exists. The periodical basis refers, for example, to the cycle shorter than the period of imaging of the imaging data D−4 to D+2 described in FIG. 2. In this manner, since the passenger detection unit 62 outputs the information indicative of the presence of the passenger to the recording control unit 23 on a periodical basis, it is made possible to indicate the presence or absence of the passenger in the period of imaging of respective pieces of imaging data D−4 to D+2 described in FIG. 2 even when a passenger exists for a long period of time.

When recording of the imaging data stored in the buffer memory 24 into the recording unit 33 is not caused by the event that has been detected by the event detection unit 22, the recording control unit 23 determines whether or not the audio data should be erased from the imaging data in accordance with whether or not a passenger exists.

If a passenger exists, the recording control unit 23 erases the audio data from the imaging data and records only the video data in the recording unit 33. Also, if no passenger exists, the recording control unit 23 records the imaging data in the recording unit 33 without erasing the audio data even when occurrence of an event has not been detected by the event detection unit 22.

Figure 9:
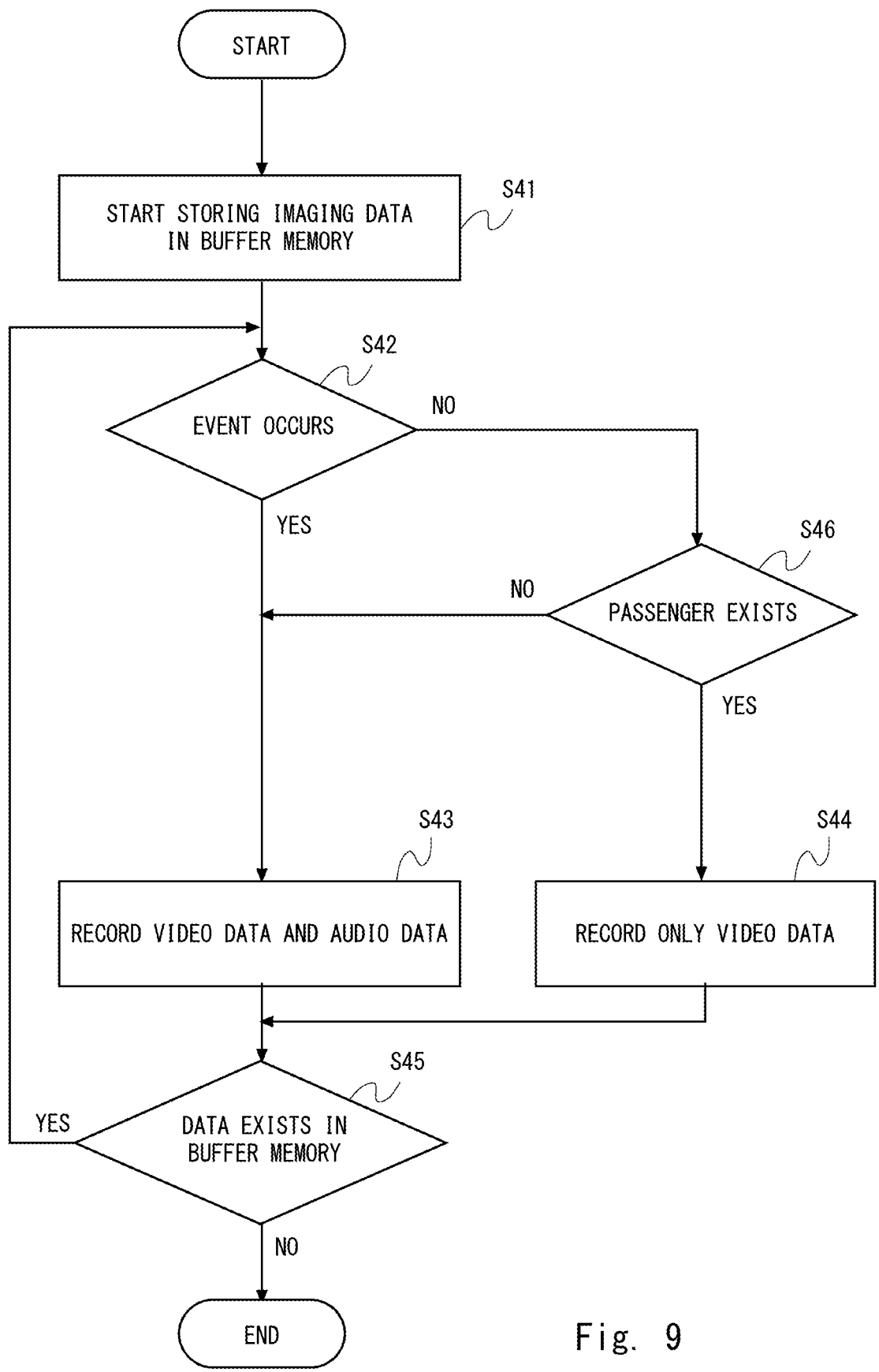
FIG. 9 is a diagram illustrating a flow of recording processing to record imaging data according to the fourth embodiment.

Next, the flow of recording processing to record the imaging data according to the fourth embodiment will be described with reference to FIG. 9. Since the steps S41 to S45 are the same as or similar to the steps S11 to S15 of FIG. 3, detailed explanations thereof will not be repeated.

When the recording control unit 23 determines in the step S42 that no event has occurred, the recording control unit 23 further determines whether or not a passenger exists (S46). When the recording control unit 23 determines that no passenger exists, the recording control unit 23 records, in the recording unit 33, the imaging data stored in the buffer memory 24 without erasing the audio data from the imaging data (S43). When the recording control unit 23 determines that a passenger exists, the recording control unit 23 records, in the recording unit 33, the imaging data stored in the buffer memory 24 with the audio data erased from the imaging data (S44).

As described in the foregoing, by using the recording device 60 according to the fourth embodiment, it is made possible to determine whether or not a passenger exists in the vehicle incorporating the recording device 60. By virtue of this, the recording device 60 can erase audio data in a situation where any conversation with a passenger may occur in terms of protection of privacy of the driver and the passenger.

Fifth Embodiment

Next, an example of a configuration of a recording device 10 according to the fifth embodiment will be described with reference to FIG. 1. Here, detailed explanations will not be repeated regarding the same or similar content as the configuration of the recording device 10 described in the first embodiment, and the following explanations focus on the processing or the like different from that which is performed by the recording device 10 described in the first embodiment. Also, the recording device 10 may be configured to include the constituent components realized by the control unit 20. Specifically, the recording device 10 includes the imaging data acquisition unit 21, the event detection unit 22, the recording control unit 23, and the reproduction control unit 25.

In the recording device 10 according to the fifth embodiment, the recording control unit 23 records the imaging data stored in the buffer memory 24 in a file format into the recording unit 33. The recording control unit 23 records imaging data to be recorded in the recording unit 33, recording of which is caused by the event that has been detected by the event detection unit 22 (hereinafter called "event imaging data") and imaging data to be recorded in the recording unit 33, recording of which is not caused by the event that has been detected by the event detection unit 22 (hereinafter referred to as "non-event imaging data") in the recording unit 33 in such a manner that they are distinguished from each other. Recording the event imaging data and the non-event imaging data in the recording unit 33 such that they are distinguished from each other may imply, for example, that a memory area in the recording unit 33 where the event imaging data is to be recorded is different than a memory area in the recording unit 33 where the non-event imaging data is to be recorded. Specifically, the recording control unit 23 designates the address of the memory area in the recording unit 33 in which the event imaging data is to be recorded so as to record the event imaging data in the recording unit 33. Also, the recording control unit 23 designates the address of the memory area in the recording unit 33 in which the non-event imaging data is to be recorded so as to record the non-event imaging data in the recording unit 33. Specifically, the recording control unit 23 generates, from the imaging data stored in the buffer memory 24, a moving image file including the video data and the audio data and records it in the recording unit 33.

Alternatively, recording the event imaging data and the non-event imaging data in the recording unit 33 such that they are distinguished from each other may include specifying, by the recording control unit 23, flag information or the like indicating that this is event imaging data in the header or the payload of the event imaging data. Also, the recording control unit 23 may specify flag information or the like indicating that this is non-event imaging data in the header or the payload of the non-event imaging data or may not specify the flag information. That is, the imaging data for which the flag information is not specified may be recognized as non-event imaging data. In contrast, when the flag information indicating that this is non-event imaging data is specified in the header or the payload of the non-event imaging data, the flag information does not need to be specified for the event imaging data.

Also, the recording control unit 23 may record the event imaging data in the recording unit 33 as overwrite-prohibited data. For example, the recording control unit 23 may designate an address of a memory area in the recording unit 33 where overwriting of data is prohibited so as to record the event imaging data in the recording unit 33. Alternatively, the recording control unit 23 may specify flag information or the like indicating that overwriting is prohibited in the header or the payload of the event imaging data. The memory area in the recording unit 33 where overwriting of data is prohibited and the address of the memory area in the recording unit 33 in which the event imaging data is to be recorded may be identical with each other and either of these memory areas may be included in the other memory area.

Further, the recording control unit 23 may record the non-event imaging data in the recording unit 33 as overwritable data. For example, the recording control unit 23 may designate an address of a memory area in the recording unit 33 where overwriting of data is allowed so as to record the non-event imaging data in the recording unit 33. Alternatively, recording control unit 23 may specify flag information indicating that overwriting is allowed in the header or payload of the non-event imaging data. The memory area in the recording unit 33 where overwriting of data is allowed and the address of the memory area in the recording unit 33 where the non-event imaging data is to be recorded may be identical with each other and either of these memory areas may be included in the other memory area.

The recording unit 33 records the data that has been output from the recording control unit 23, in other words, data that has been migrated via the recording control unit 23 from the buffer memory 24.

The reproduction control unit 25 acquires the imaging data recorded in the recording unit 33, outputs the video data based on the acquired imaging data to the display unit 35, and outputs the audio data based on the acquired imaging data to the speaker 36, etc. When the reproduction control unit 25 reproduces the event imaging data, the reproduction control unit 25 outputs the video data included in the event imaging data to the display unit 35 and outputs the audio data included in the event imaging data to the speaker 36, etc. When the reproduction control unit 25 reproduces non-event imaging data, the reproduction control unit 25 outputs the video data included in the non-event imaging data to the display unit 35 but does not output the audio data included in the non-event imaging data to the speaker 36, etc.

When the reproduction control unit 25 has received a reproduction instruction information instructing reproduction of event imaging data entered by a user operating the recording device 10, then the reproduction control unit 25 acquires the event imaging data which the user wants to reproduce from the memory area in the recording unit 33 where the event imaging data is to be recorded. Alternatively, when the reproduction control unit 25 has received a reproduction instruction information instructing reproduction of event imaging data entered by the user operating the recording device 10, the reproduction control unit 25 extracts event imaging data having flag information indicating that this is event imaging data. Further, the reproduction control unit 25 selects the event imaging data that the user wants to reproduce from among the pieces of event imaging data that have been extracted.

When the reproduction control unit 25 has received a reproduction instruction information instructing reproduction of non-event imaging data entered by a user operating the recording device 10, then the reproduction control unit 25 acquires the non-event imaging data which the user wants to reproduce from the memory area in the recording unit 33 where the non-event imaging data is to be recorded. At this point, the reproduction control unit 25 may acquire only the video data included in the non-event imaging data. Alternatively, the reproduction control unit 25 may acquire the video data and the audio data included in the non-event imaging data and output only the video data to the display unit 35. Alternatively, the reproduction control unit 25 may acquire the video data and the audio data included in the non-event imaging data and output the video data to the display unit 35 and output the audio data to the speaker 36, etc. with its output level set to zero.

When the reproduction control unit 25 has received a reproduction instruction information instructing reproduction of non-event imaging data entered by the user operating the recording device 10, then the reproduction control unit 25 extracts non-event imaging data having flag information indicating that this is non-event imaging data. Further, the reproduction control unit 25 selects the non-event imaging data which the user wants to reproduce from among the pieces of non-event imaging data that have been extracted. At this point, the reproduction control unit 25 may acquire only the video data included in the non-event imaging data that have been selected. Alternatively, reproduction control unit 25 may acquire the video data and the audio data included in the non-event imaging data that has been selected and output only the video data to the display unit 35.

Here, the relationship between the data recorded in the recording unit 33 and the data recorded in the buffer memory 24 will be described with reference to FIG. 10. Here, detailed explanations of the content common to FIGS. 10 and 2 are omitted and the explanations focus on the content different from that in FIG. 2.

When the recording control unit 23 determines, for example, at the time t2 that no event has occurred in the period from the time t1 to the time t2, then the recording control unit 23 records the imaging data D-2 in the recording unit 33 as non-event imaging data. Specifically, the recording control unit 23 designates the address of the memory area in the recording unit 33 in which the non-event imaging data is to be recorded so as to record the imaging data D-2 stored in the buffer memory 24 in the recording unit 33 as non-event imaging data. Alternatively, the recording control unit 23 specifies the flag information indicating that this is non-event imaging data in the header or the payload of the imaging data D-2 stored in the buffer memory 24 and records the imaging data D-2 in the recording unit 33 as non-event imaging data.

Meanwhile, when the recording control unit 23 determines at the time t4 that an event occurred at the time t6 in the period from the time t3 to the time t4, then the recording control unit 23 records the imaging data D in the recording unit 33 as event imaging data. Specifically, the recording control unit 23 designates the address of the memory area in the recording unit 33 in which the event imaging data is to be recorded so as to record the imaging data D stored in the buffer memory 24 in the recording unit 33 as event imaging data. Alternatively, the recording control unit 23 specifies flag information indicating that this is event imaging data in the header or the payload of the imaging data D stored in the buffer memory 24 and records the imaging data D in the recording unit 33 as event imaging data.

Figure 10:
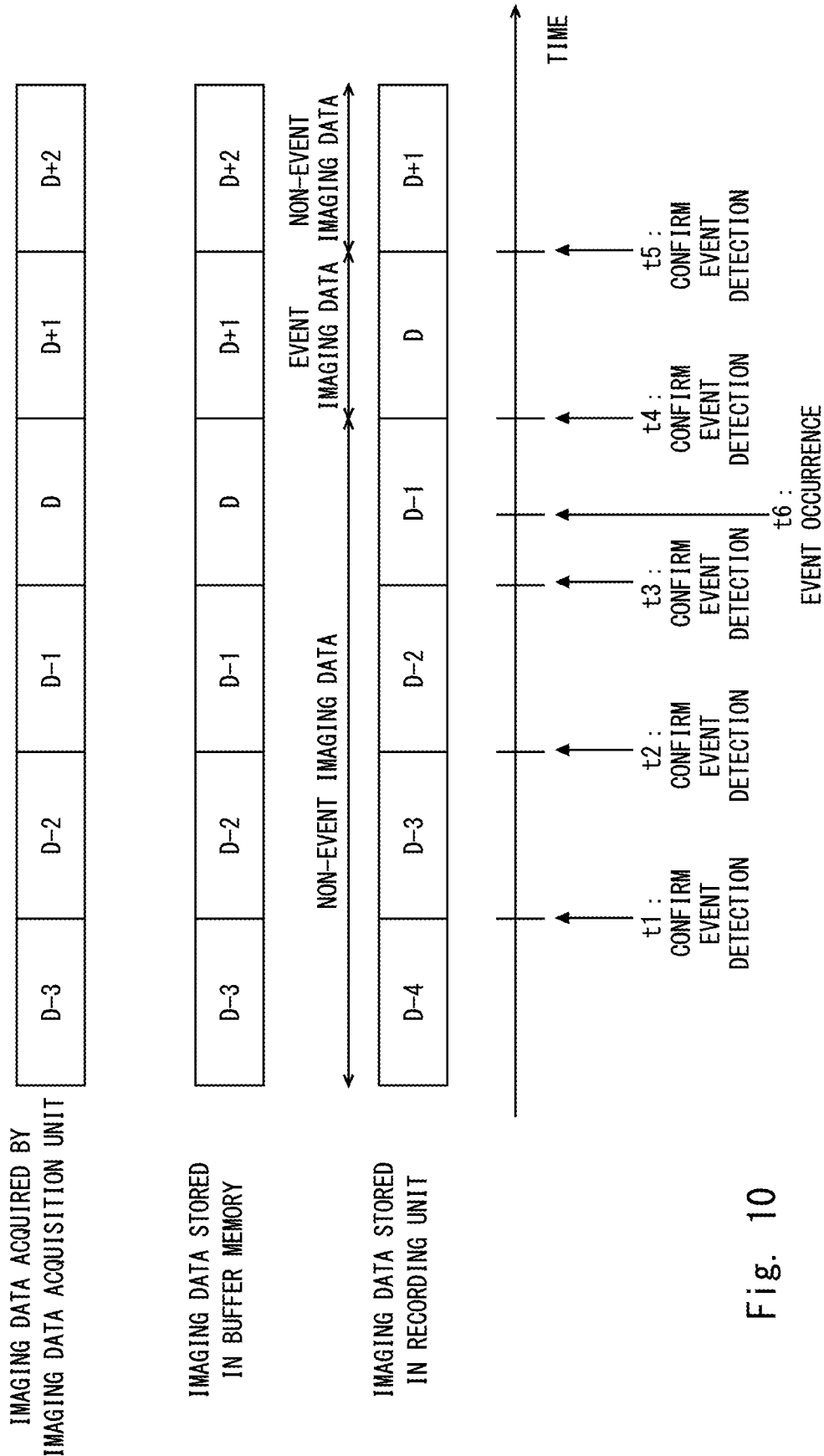
FIG. 10 is a diagram illustrating a relationship between data recorded in a recording unit and data recorded in a buffer memory according to the fifth embodiment.

Also, FIG. 10 illustrates a configuration in which the recording control unit 23 records only the imaging data acquired by the imaging data acquisition unit 21 in a period including the time point at which the event occurred into the recording unit 33 as event imaging data. The recording control unit 23 is not limited to this and, for example, may record, in addition to the imaging data acquired by the imaging data acquisition unit 21 in a period including the time point at which the event occurred, the imaging data acquired by the imaging data acquisition unit 21 in a period prior to the period including the time point at which the event occurred in the recording unit 33 as event imaging data. For example, the recording control unit 23 may record at the time t6, in addition to the data D acquired by the imaging data acquisition unit 21, the data D−1 in the recording unit 33 as event imaging data.

Also, when the recording control unit 23 determines that no event has occurred, the recording control unit 23 may also record the imaging data acquired in a period prior to the latest period in the recording unit 33 as non-event imaging data in addition to the imaging data acquired in the latest period stored in the buffer memory 24.

In FIG. 10, pieces of data D−4 to D−1 and data D+1 are recorded as non-event imaging data in the recording unit 33 and the piece of data D is recorded as event imaging data in the recording unit 33.

Figure 11:
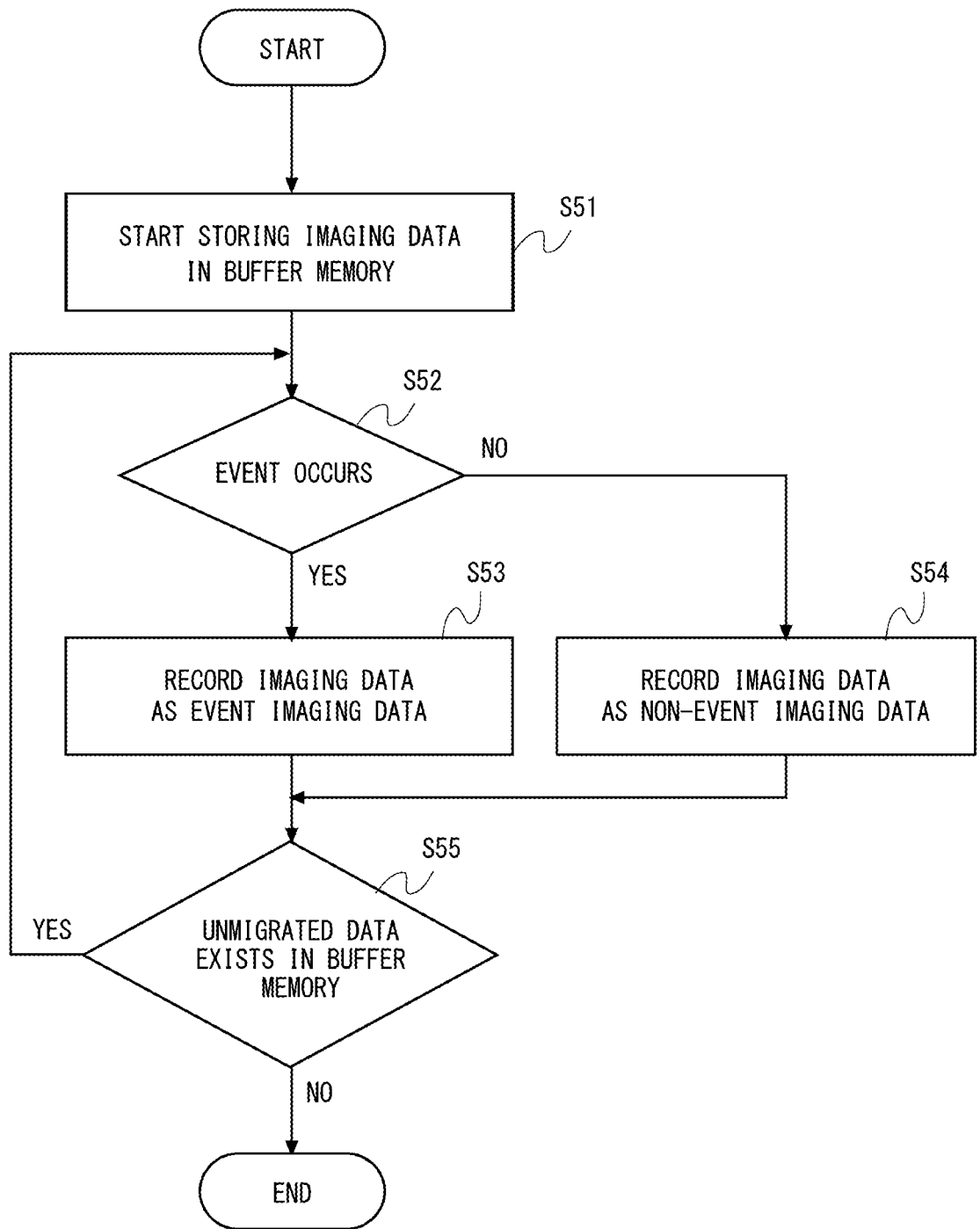
FIG. 11 is a diagram illustrating a flow of recording processing to record imaging data according to the fifth embodiment.

Next, the flow of the recording processing to record the imaging data according to the fifth embodiment will be described with reference to FIG. 11. Since the steps S51 and S52 are the same as or similar to the steps S11 and S12 of FIG. 3, detailed explanations thereof will not be repeated.

When the recording control unit 23 determines in the step S52 that an event has occurred, the recording control unit 23 records the imaging data in the recording unit 33 as event imaging data (S53). When the recording control unit 23 determines in the step S52 that no event has occurred, the recording control unit 23 records the imaging data in the recording unit 33 as non-event imaging data (S54). That is, the recording control unit 23 records the imaging data in the recording control unit 23 such that the event imaging data and the non-event imaging data are distinguished from each other.

Figure 3:
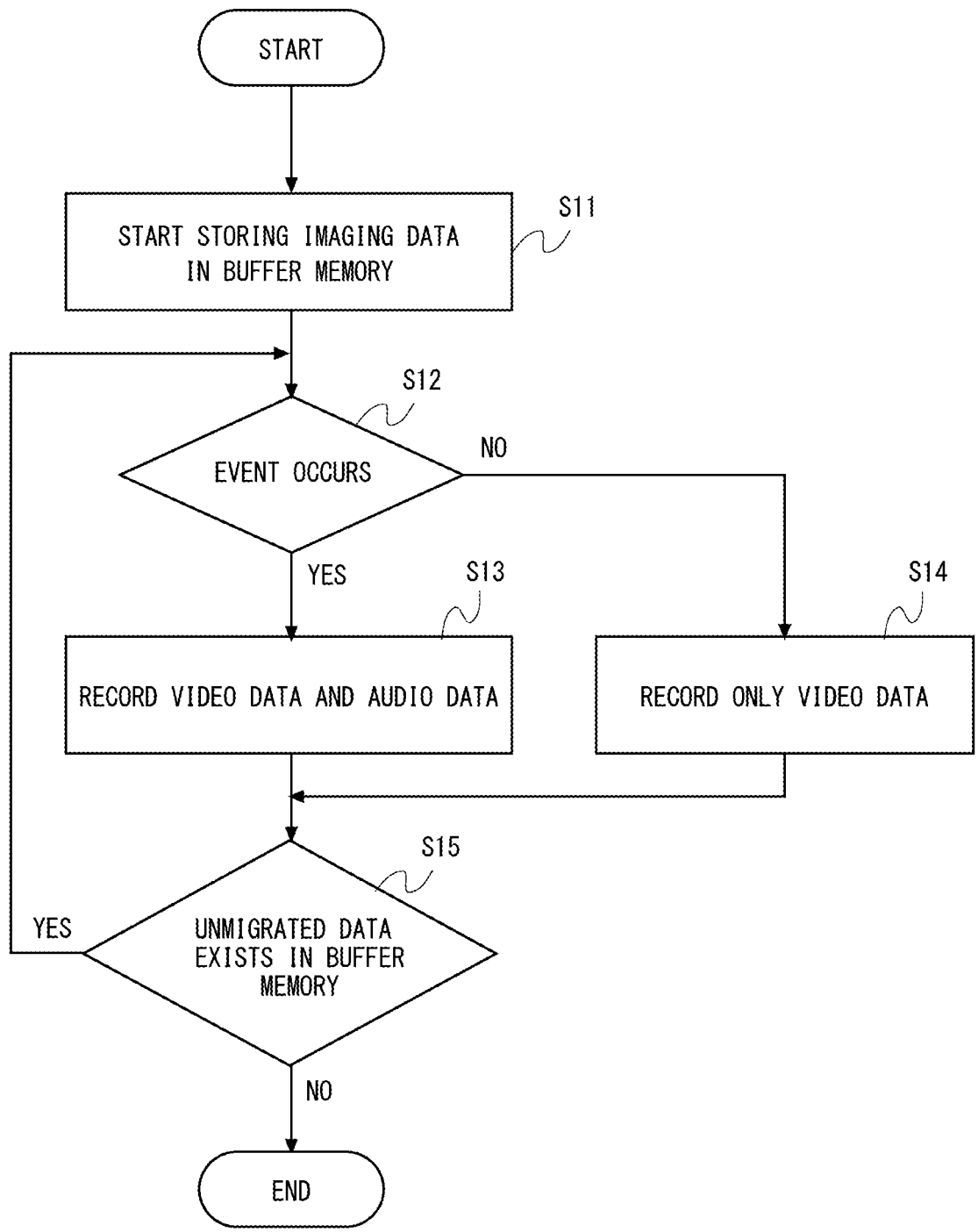
FIG. 3 is a diagram illustrating a flow of recording processing to record imaging data according to the first embodiment.

Since the step S55 is the same as or similar to the step S15 of FIG. 3, detailed explanations thereof will not be repeated.

Figure 12:
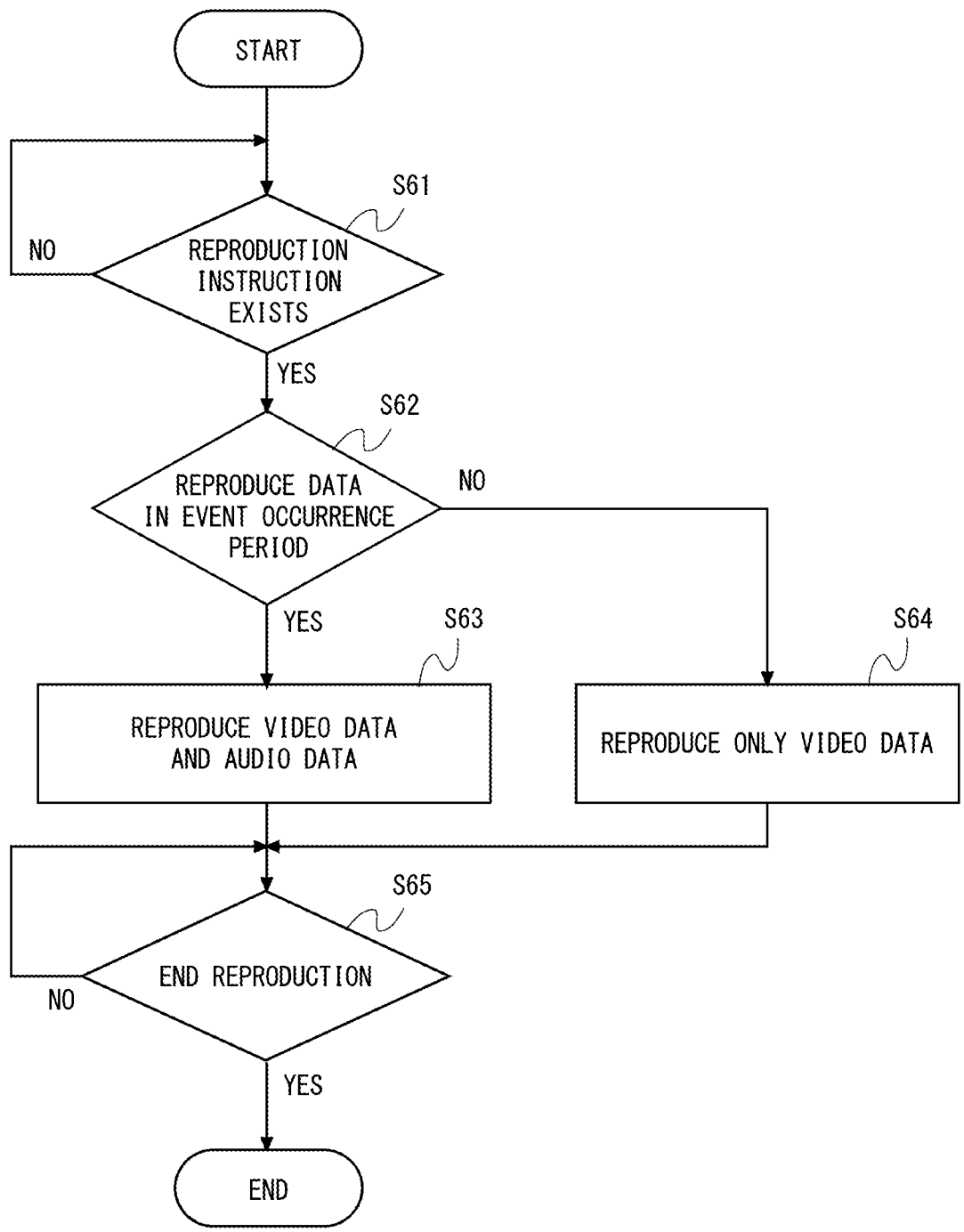
FIG. 12 is a diagram illustrating a flow of reproduction processing according to the fifth embodiment.

Next, the flow of reproduction processing for reproducing the imaging data according to the fifth embodiment will be described with reference to FIG. 12. First, the reproduction control unit 25 determines whether or not the reproduction instruction information has been received (S61). The reproduction control unit 25 may receive reproduction instruction information that has been entered by a user operating the recording device 10. When the reproduction control unit 25 determines that the reproduction instruction information has not been received, the processing at the step S61 will be repeated.

When the reproduction control unit 25 determines in the step S61 that the reproduction instruction information has been received, the reproduction control unit 25 determines whether or not the reproduction of the event imaging data which is the imaging data in the event occurrence period is instructed (S62). It is assumed here that the reproduction instruction information includes information indicative of the period of imaging of the imaging data and information indicative of whether or not the reproduction is reproduction of event imaging data or reproduction of non-event imaging data.

Alternatively, the reproduction control unit 25 may acquire in the step S62 the imaging data reproduction of which has been instructed from the recording unit 33 and determine whether the imaging data that has been acquired is event imaging data or non-event imaging data. The reproduction control unit 25 identifies the imaging data recorded in the recording unit 33, for example, by using information indicative of the period of imaging of the imaging data included in the reproduction instruction information. The reproduction control unit 25 may determine whether or not the imaging data reproduction of which has been instructed is event imaging data or non-event imaging data in accordance with the specific memory area in the recording unit 33 where the imaging data reproduction of which has been instructed is recorded. Alternatively, the reproduction control unit 25 may determine whether or not the imaging data reproduction of which has been instructed is event imaging data or non-event imaging data on the basis of the flag information specified in the imaging data reproduction of which has been instructed.

When the reproduction control unit 25 determines in the step S62 that the reproduction of the event imaging data has been instructed, the reproduction control unit 25 outputs the instructed video data included in the event imaging data to the display unit 35 and outputs the audio data to the speaker 36 (S63).

When the reproduction control unit 25 determines in the step S62 that the reproduction of the event imaging data is not instructed, in other words, determines that reproduction of the non-event imaging data is instructed, then the reproduction control unit 25 outputs the video data included in the non-event imaging data that has been instructed to the display unit 35 (S64). In this case, the reproduction control unit 25 does not output the audio data included in the non-event imaging data to the speaker 36.

After having performed the processing at the step S63 or S64, the reproduction control unit 25 determines whether or not reproduction of the event imaging data or the non-event imaging data has been completed (S65). When the reproduction control unit 25 determines that reproduction of the event imaging data or the non-event imaging data has been completed, the reproduction control unit 25 terminates the reproduction processing. When the reproduction control unit 25 determines that reproduction of the event imaging data or the non-event imaging data has not been completed, the reproduction control unit 25 repeats the processing at the step S65 until the reproduction is completed.

As described in the foregoing, the recording device 10 according to the fifth embodiment can reproduce the video data and the audio data regarding the imaging data whose period of imaging includes the particular point of time at which the event occurred. Also, the recording device 10 can reproduce only the video data without reproducing the audio data regarding the imaging data imaged in a period in which no event occurred. By virtue of this, the recording device 10 makes it possible for the imaging data at the time of occurrence of an event such as a traffic accident to contribute to identification of the cause of the accident because the imaging data includes the video data and the audio data. On the other hand, the recording device 10 does not reproduce audio data that may include speeches of a drivers or conversations between the driver and the passenger and the like with regard to the imaging data in the period in which no event has occurred and thus can protect the privacy of the driver and the passenger.

Sixth Embodiment

Next, an example of a configuration of a recording device 40 according to the sixth embodiment will be described with reference to FIG. 4. Here, detailed explanations will not be repeated regarding the same or similar content as the configuration of the recording device 40 described in the second embodiment, and the following explanations focus on the processing or the like different from that which is performed by the recording device 40 described in the second embodiment. Also, the recording device 40 may be configured to include the constituent components realized by the control unit 41. Specifically, the recording device 40 includes the imaging data acquisition unit 21, the event detection unit 22, the recording control unit 23, the reproduction control unit 25, and the volume level acquisition unit 42.

While FIG. 4 illustrates a configuration in which the volume level acquisition unit 42 is arranged between the microphone 32 and the recording control unit 23, the volume level acquisition unit 42 may be arranged between the imaging data acquisition unit 21 and the recording control unit 23, or may be arranged between the recording unit 33 and the reproduction control unit 25.

When recording of the imaging data stored in the buffer memory 24 into the recording unit 33 is not caused by the event that has been detected by the event detection unit 22, the recording control unit 23 records the imaging data as non-event imaging data and further records the information on the volume level of the audio data in the recording unit 33.

When the reproduction control unit 25 reproduces the event imaging data, the reproduction control unit 25 outputs the video data included in the event imaging data to the display unit 35 and outputs the audio data included in the event imaging data to the speaker 36.

When the reproduction control unit 25 reproduces the non-event imaging data, the reproduction control unit 25 determines whether or not the audio data should be reproduced in accordance with the volume level of the audio data. For example, the reproduction control unit 25 has a threshold 1 for the volume level between the volume at a level of normal conversation and a loud voice above the level of normal conversation. That is, the threshold 1 is used to identify a normal conversation level and a volume level above the normal conversation level. The loud voice above the level of normal conversation may be, for example, a human scream or shouting voice, etc.

If the volume level is lower than the threshold 1, the reproduction control unit 25 does not reproduce the audio data included in the non-event imaging data. Also, if the sound level exceeds the threshold 1, the reproduction control unit 25 reproduces the audio data included in the non-event imaging data even when the occurrence of the event has not been detected by the event detection unit 22.

Since the reproduction control unit 25 uses the threshold 1 to determine whether or not the audio data included in the non-event imaging data should be reproduced, privacy of the driver or passenger can be protected. That is, if the audio data included in the non-event imaging data includes the volume level of the normal conversation level, the audio data is not reproduced, so that the privacy of the driver or passenger is protected. Also, in a case where it is expected that a certain abnormality has occurred in the vehicle considering the detection of a loud voice above the level of normal conversation although no event is detected by the sensor 34, or in other similar cases, the reproduction control unit 25 can reproduce the audio data along with the video data included in the non-event imaging data.

Also, the reproduction control unit 25 may have a threshold 2 for the volume level between the volume at a level of normal conversation and the volume lower than the normal conversation level. That is, the threshold 2 is used to identify the normal conversation level and a volume level lower than that. The volume lower than the normal conversation level may be, for example, silence or mechanical sound, and the like.

If the volume level exceeds the threshold 2, the reproduction control unit 25 does not reproduce the audio data included in the non-event imaging data. Also, if the sound level is lower than the threshold 2, the reproduction control unit 25 reproduces the audio data included in the non-event imaging data even when the occurrence of the event has not been detected by the event detection unit 22.

Since the reproduction control unit 25 uses the threshold 2 to determine whether or not the audio data included in the non-event imaging data should be reproduced, privacy of the driver or passenger can be protected. That is, the audio data is not reproduced if the audio data included in the non-event imaging data includes the volume level of the normal conversation level, so that the privacy of the driver or passenger is protected.

Further, if the sound level falls within the range that would not reveal the privacy of the driver and the passenger, the reproduction control unit 25 outputs the video data and the audio data to the display unit 35 and the speaker 36. Such processing is of an ordinary nature for reproducing imaging data, the processing load in the reproduction control unit 25 can be suppressed.

Also, the reproduction control unit 25 may use the thresholds 1 and 2 to determine whether or not the audio data included in the non-event imaging data should be reproduced. For example, the reproduction control unit 25 outputs the video data included in the non-event imaging data to the display unit 35, and outputs the audio data to the speaker 36 both in the case where the volume level exceeds the threshold 1 and in the case where it is lower than the threshold 2. Also, the display unit 35 outputs only the video data included in the non-event imaging data to the display unit 35 but does not output the audio data to the speaker 36 in a case where the volume level is lower than the threshold 1 and exceeds the threshold 2.

Next, the flow of the reproduction processing according to the sixth embodiment will be described with reference to FIG. 13. Since the steps S71 to S75 are the same as or similar to the steps S61 to S65 of FIG. 12, detailed explanations thereof will not be repeated.

When the reproduction control unit 25 determines in the step S72 that reproduction of the non-event imaging data is instructed, the reproduction control unit 25 determines whether or not the volume level of the audio data included in the non-event imaging data is lower than the threshold 1 (S76).

When the reproduction control unit 25 determines that the volume level is lower than the threshold 1, the reproduction control unit 25 outputs only the video data to the display unit 35 without outputting the audio data included in the non-event imaging data to the speaker 36 (S74). When the reproduction control unit 25 determines that the volume level exceeds the threshold 1, the reproduction control unit 25 outputs the video data included in the non-event imaging data to the display unit 35, and outputs the audio data to the speaker 36 (S73).

Figure 13:
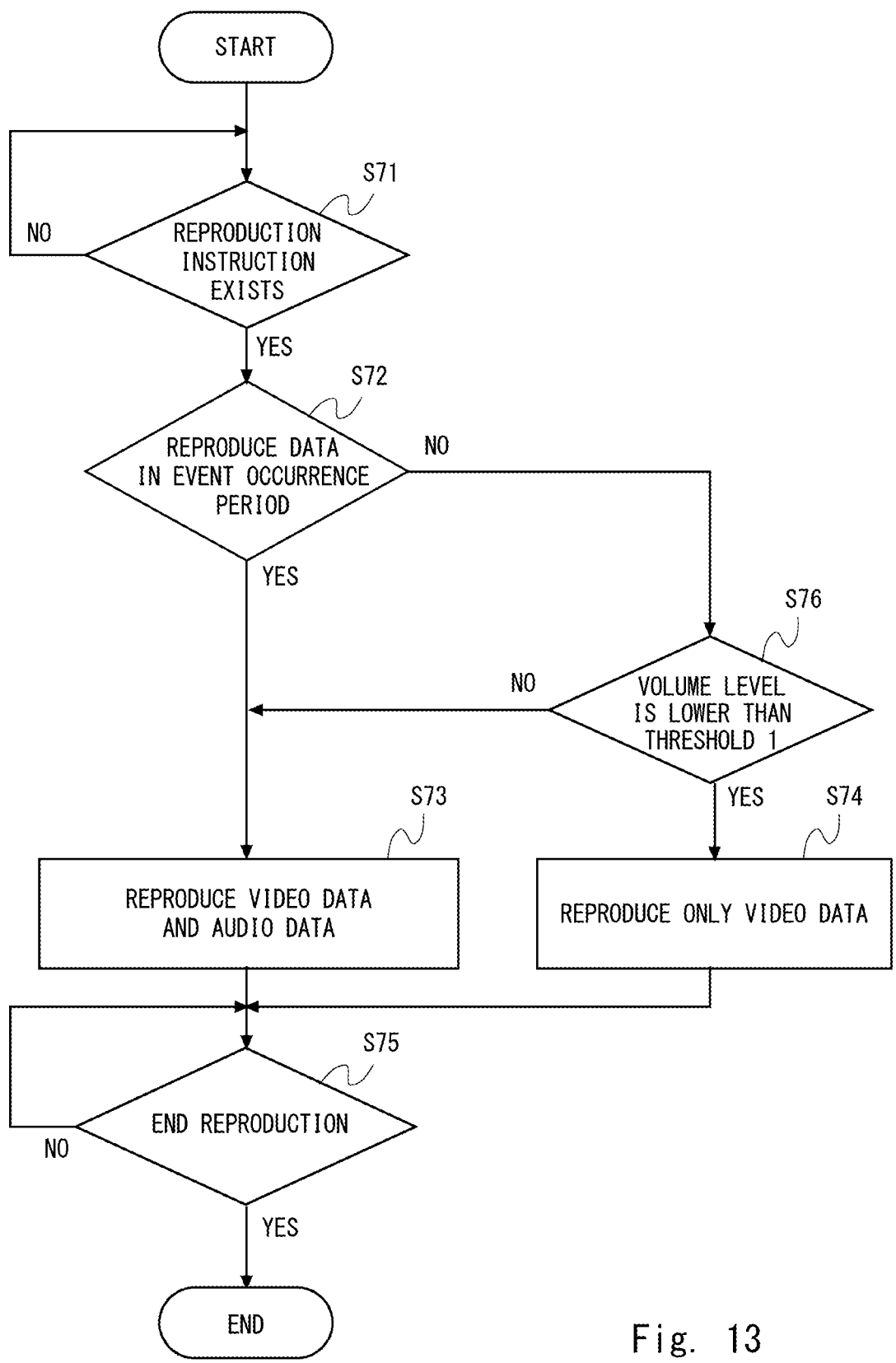
FIG. 13 is a diagram illustrating a flow of reproduction processing according to the sixth embodiment.

While FIG. 13 illustrates the processing according to which, in the step S76, the reproduction control unit 25 determines whether or not the volume level is lower than the threshold 1, it may perform the processing for determining whether or not the volume level is lower than the threshold 2. In this case, the reproduction control unit 25 performs the processing at the step S73 if the volume level is lower than the threshold 2 and performs the processing at the step S74 if the volume level exceeds the threshold 2.

Also, the reproduction control unit 25 may determine whether or not the volume level is lower than the threshold 1 and exceeds the threshold 2. In this case, the reproduction control unit 25 performs the processing at the step S74 if the volume level is lower than the threshold 1 and exceeds the threshold 2 and performs the processing at the step S73 if the condition that the volume level be lower than the threshold 1 and exceed the threshold 2 is not satisfied.

As described in the foregoing, the recording device 40 according to the sixth embodiment can reproduce the video data and the audio data for the imaging data whose period of imaging includes the particular point of time at which the event occurred. Also, the recording device 40 can prevent reproduction of audio data having a volume level of a normal conversation level for the imaging data imaged in a period where no event has occurred. By virtue of this, the recording device 40 can protect the privacy of the driver and the passenger. On the other hand, the recording device 40 can reproduce the audio data having volume level that implies that an abnormality occurred in the vehicle, i.e., the volume level equal to or higher than the normal conversation level for the imaging data imaged in a period where no event has occurred. By virtue of this, the recording device 40 makes it possible for the non-event imaging data to contribute to identification of the cause of a certain abnormality occurring in the vehicle.

Seventh Embodiment

Next, an example of a configuration of a recording device 50 according to the seventh embodiment will be described with reference to FIG. 6. Here, detailed explanations will not be repeated regarding the same or similar content as the configuration of the recording device 50 described in the third embodiment, and the following explanations focus on the processing or the like different from that which is performed by the recording device 50 described in the third embodiment. Also, the recording device 50 may be configured to include the constituent components realized by the control unit 51. Specifically, the recording device 50 includes the imaging data acquisition unit 21, the event detection unit 22, the recording control unit 23, the reproduction control unit 25, and the speech analysis unit 52.

While FIG. 6 illustrates a configuration in which the speech analysis unit 52 is arranged between the microphone 32 and the recording control unit 23, the speech analysis unit 52 may be arranged between the imaging data acquisition unit 21 and the recording control unit 23, or may be arranged between the recording unit 33 and the reproduction control unit 25.

When recording of the imaging data stored in the buffer memory 24 into the recording unit 33 is not caused by the event that has been detected by the event detection unit 22, then the recording control unit 23 records the imaging data as non-event imaging data and records the information on whether or not speech is included in the audio data in the recording unit 33.

When the reproduction control unit 25 reproduces the event imaging data, the reproduction control unit 25 outputs the video data included in the event imaging data to the display unit 35 and outputs the audio data included in the event imaging data to the speaker 36.

When the reproduction control unit 25 reproduces non-event imaging data, the reproduction control unit 25 determines whether or not the audio data should be reproduced in accordance with whether or not speech is included in the audio data. When the reproduction control unit 25 reproduces non-event imaging data, the reproduction control unit 25 outputs video data to the display unit 35 without outputting audio data to the speaker 36 if speech is included in the audio data.

Figure 14:
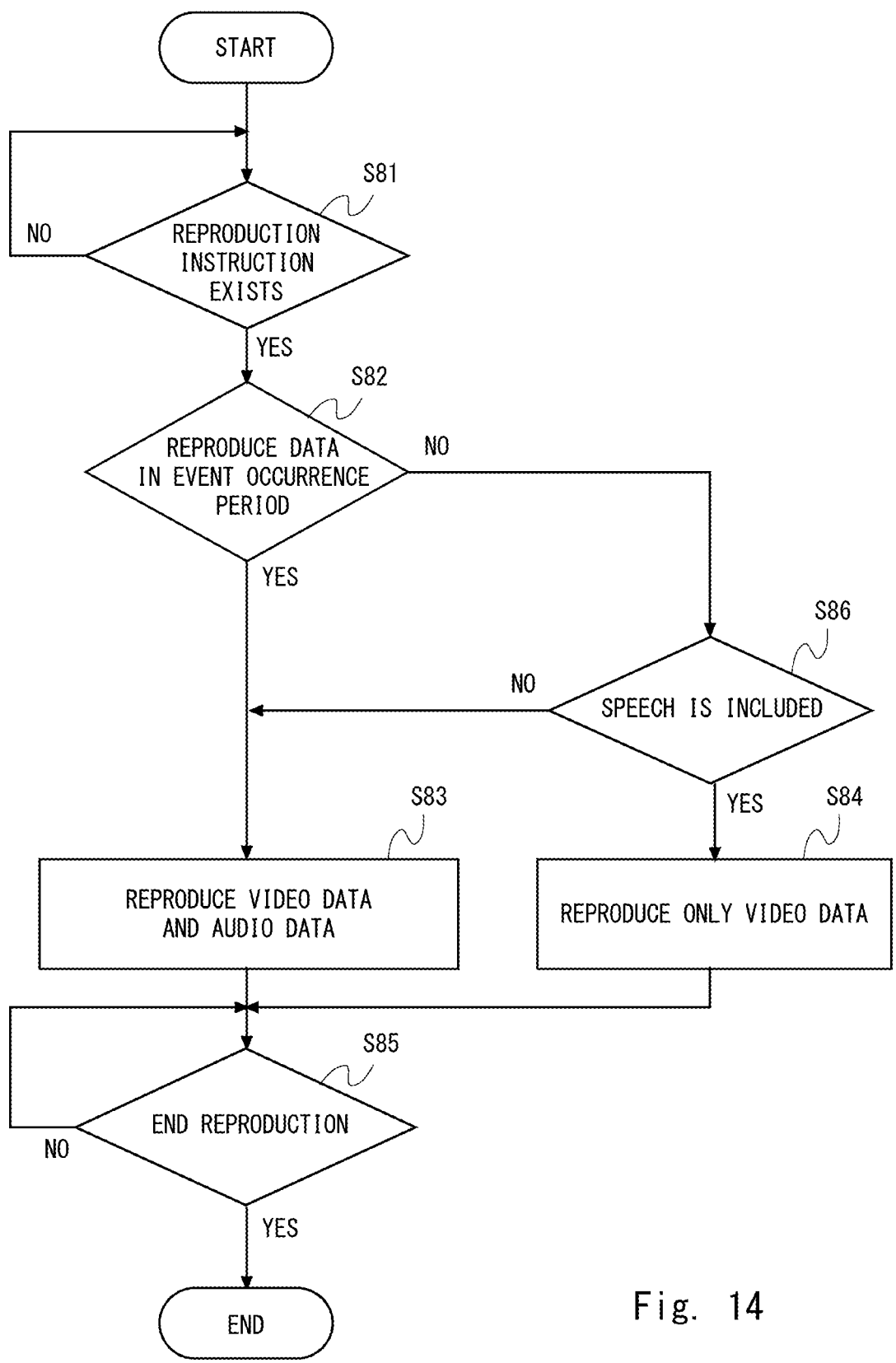
FIG. 14 is a diagram illustrating a flow of reproduction processing according to the seventh embodiment.

Next, the flow of the reproduction processing according to the seventh embodiment will be described with reference to FIG. 14. Since the steps S81 to S85 are the same as or similar to the steps S61 to S65 of FIG. 12, detailed explanations thereof will not be repeated.

When the reproduction control unit 25 determines in the step S82 that the reproduction of the non-event imaging data is instructed, the reproduction control unit 25 determines whether or not speech is included in the audio data included in the non-event imaging data (S86).

When the reproduction control unit 25 determines that speech is included, the reproduction control unit 25 does not output the audio data included in the non-event imaging data to the speaker 36 and outputs only the video data to the display unit 35 (S84). When the reproduction control unit 25 determines that no speech is included, then the reproduction control unit 25 outputs the video data and audio data included in the non-event imaging data to the display unit 35 and the speaker 36 (S83).

As described in the foregoing, by using the recording device 50 according to the seventh embodiment, it is made possible to determine whether or not speech is included in the audio data. By virtue of this, recording device 50, it is made possible to avoid reproduction of audio data including speech whose reproduction is least desirable in terms of protection of privacy.

Eighth Embodiment

Next, an example of a configuration of a recording device 60 according to the eighth embodiment will be described with reference to FIG. 8. Here, detailed explanations will not be repeated regarding the same or similar content as the configuration of the recording device 60 described in the fourth embodiment, and the following explanations focus on the processing or the like different from that which is performed by the recording device 60 described in the fourth embodiment. Also, the recording device 60 may be configured to include the constituent components realized by the control unit 61. Specifically, the recording device 60 includes the imaging data acquisition unit 21, the event detection unit 22, the recording control unit 23, the reproduction control unit 25, and the passenger detection unit 62.

When recording of the imaging data stored in the buffer memory 24 into the recording unit 33 is not caused by the event that has been detected by the event detection unit 22, the recording control unit 23 records the imaging data as non-event imaging data and further records the information on whether or not a passenger exists in the recording unit 33.

When the reproduction control unit 25 reproduces the event imaging data, the reproduction control unit 25 outputs the video data included in the event imaging data to the display unit 35 and outputs the audio data included in the event imaging data to the speaker 36.

When the reproduction control unit 25 reproduces the non-event imaging data, the reproduction control unit 25 determines whether or not the audio data should be reproduced in accordance with whether or not a passenger exists in the vehicle that incorporates the recording device 60. When the reproduction control unit 25 reproduces the non-event imaging data that has been acquired while a passenger exists, the reproduction control unit 25 outputs the video data to the display unit 35 without outputting the audio data to the speaker 36.

Figure 15:
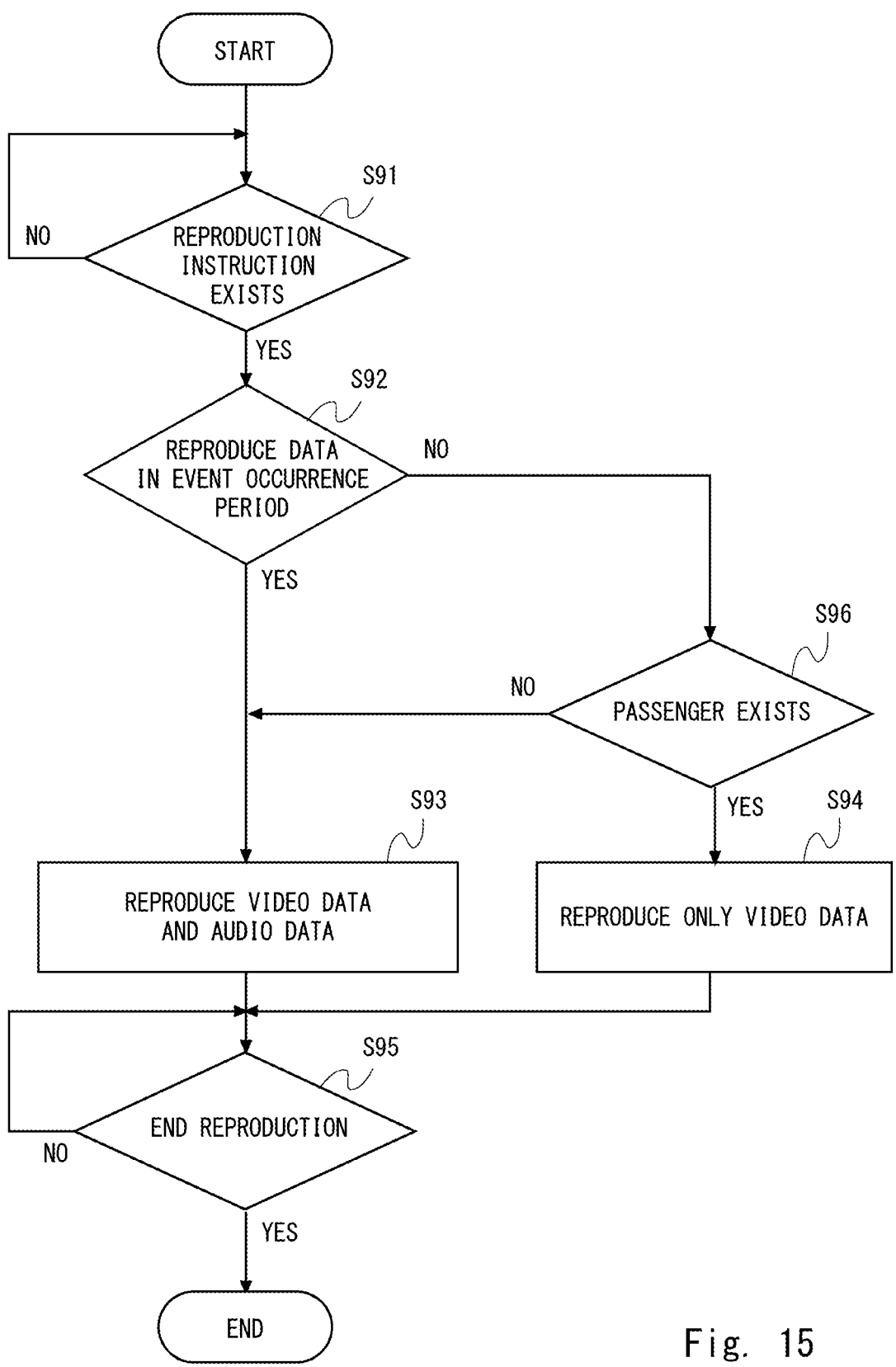
FIG. 15 is a diagram illustrating a flow of reproduction processing according to the eighth embodiment.

Next, the flow of the reproduction processing according to the eighth embodiment will be described with reference to FIG. 15. Since the steps S91 to S95 are the same as or similar to the steps S61 to S65 of FIG. 12, detailed explanations thereof will not be repeated.

When the reproduction control unit 25 determines in the step S92 that the reproduction of the non-event imaging data is instructed, then the reproduction control unit 25 determines whether or not a passenger existed when the same non-event imaging data was acquired (S96).

When the reproduction control unit 25 determined that a passenger had existed, the reproduction control unit 25 outputs only the video data to the display unit 35 without outputting the audio data included in the non-event imaging data on the speaker 36 (S94). When the reproduction control unit 25 determined that no passenger had existed, the reproduction control unit 25 outputs the video data included in the non-event imaging data to the display unit 35 and outputs the audio data to the speaker 36 (S93).

As described in the foregoing, by using the recording device 60 according to the eighth embodiment, it is made possible to determine whether or not a passenger existed when the non-event imaging data whose reproduction is requested was acquired. By virtue of this, recording device 60 can avoid reproduction of audio data in a situation where a conversation with a passenger may occur in terms of protection of privacy.

Ninth Embodiment

Next, an example of a configuration of a reproduction device 70 according to the ninth embodiment will be described with reference to FIG. 16. The reproduction device 70 is a device that reproduces the event imaging data and the non-event imaging data recorded in the recording unit 33 in the recording device 10, the recording device 40, the recording device 50, and the recording device 60 (hereinafter called "recording device 10, etc.") which have been described in Embodiments 5 to 8.

For example, the recording device 10, etc. records the event imaging data and the non-event imaging data recorded in the recording unit 33 in a portable recording medium such as an optical disc or a card-type recording medium. The portable recording medium may have a memory area for recording the event imaging data and a memory area for recording a non-event imaging data, where these memory areas are separated from each other. In this case, the recording device 10 records the event imaging data recorded in the recording unit 33 into the memory area of the portable recording medium for recording the event imaging data.

Also, the recording device 10 records the non-event imaging data recorded in the recording unit 33 into the memory area of the portable recording medium for recording the non-event imaging data.

Alternatively, it is assumed here that flag information for identifying event imaging data and non-event imaging data is specified in the event imaging data and the non-event imaging data recorded in the recording unit 33. In this case, the memory area in the portable recording medium does not need to be divided into a memory area for recording event imaging data and memory area for recording non-event imaging data.

The reproduction device 70 is configured to reproduce event imaging data and non-event imaging data recorded in a recording medium. The reproduction device 70 may be a computer device that operates by its processor executing a program stored in its memory unit. For example, the reproduction device 70 may be a mobile phone terminal, a smartphone terminal, a personal computer, or the like. Further, the reproduction device 70 may be a video camera, a digital camera, a recording and reproduction device of home or business use, and the like.

Here, an example of a configuration of the reproduction device 70 will be described. The reproduction device 70 has a data reading unit 71, a reproduction control unit 72, a display unit 73, and a speaker 74. The display unit 73 is the same as or similar to the display unit 35 of the recording device 10, etc. and the speaker 74 is the same as or similar to the speaker 36 of the recording device 10, etc., so that detailed explanations thereof will not be repeated. The data reading unit 71 and the reproduction control unit 72 may be software or a module whose processing is carried out by the processor executing the program stored in the memory unit. Alternatively, the data reading unit 71 and the reproduction control unit 72 may be a hardware component such as a circuit, a chip, and the like.

The data reading unit 71 is configured to read data recorded in the portable recording medium and decode the data that has been read. The data reading unit 71 is also configured to output the data that has been decoded to the reproduction control unit 72. When the reproduction control unit 72 reproduces event imaging data, the reproduction control unit 72 outputs the video data included in the event imaging data to the display unit 73 and outputs the audio data to the speaker 74.

When the data reading unit 71 read the data from the memory area that stores event imaging data, the data reading unit 71 outputs information indicating that this is event imaging data to the reproduction control unit 72 along with the decoded data. When the data reading unit 71 read data from the memory area that stores non-event imaging data, the data reading unit 71 outputs information indicating that this is non-event imaging data to the reproduction control unit 72 along with the decoded data.

When data including the flag information for identifying the event imaging data and the non-event imaging data is recorded in the portable recording medium, the data that has been decoded by the data reading unit 71 also includes the flag information for identifying the event imaging data and the non-event imaging data.

When the reproduction control unit 72 reproduces non-event imaging data, the reproduction control unit 72 outputs the video data to the display unit 73 without outputting the audio data included in the event imaging data to the speaker 74.

The reproduction control unit 72 specifically may perform the reproduction processing which have been described in FIGS. 12 to 15.

Figure 16:
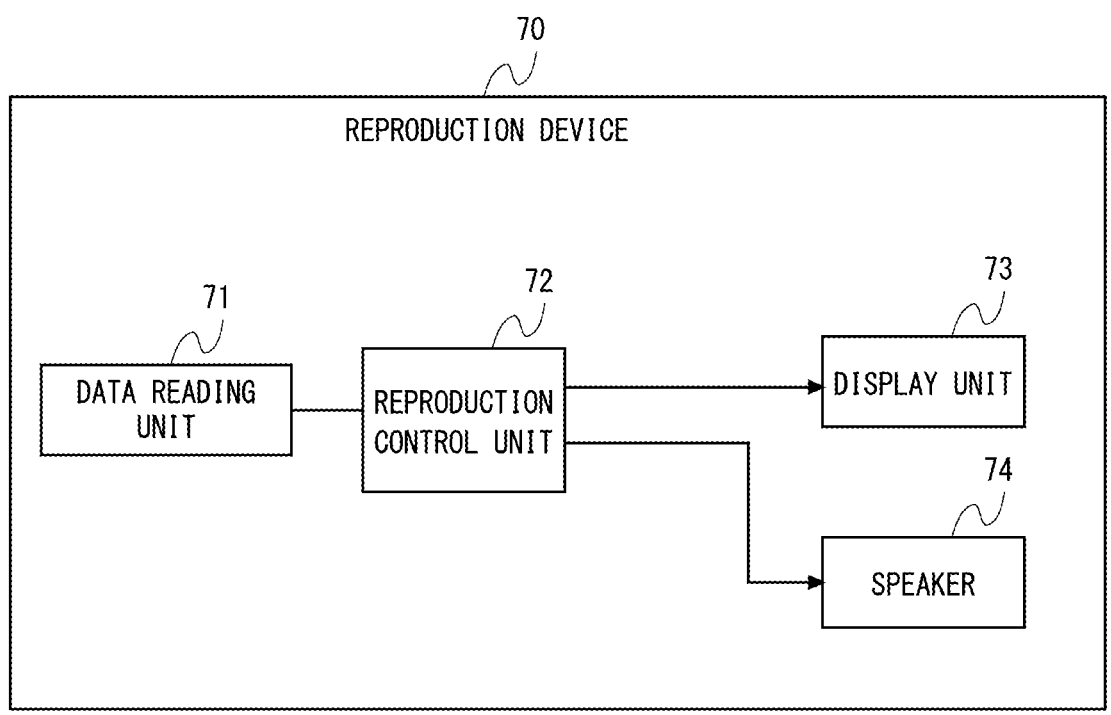
FIG. 16 is a configuration diagram of a reproduction device according to the ninth embodiment.

As described in the foregoing, the reproduction device of FIG. 16 is capable of reproducing the event imaging data and the non-event imaging data recorded in the recording device 10, etc. In other words, a user can reproduce the event imaging data and the non-event imaging data recorded by the recording device 10, etc. on the reproduction device 70 which is a device different than the recording device 10, etc. As a result, the user does not need to reproduce the event imaging data and the non-event imaging data recorded by the recording device 10, etc. on the same recording device 10. As result of this, the user can enjoy improved usability.

Tenth Embodiment

Next, an example of a configuration of a recording device 80 according to the tenth embodiment will be described with reference to FIG. 17. The recording device 80 has a control unit 81 instead of the control unit 20 in the recording device 10 of FIG. 1. Further, the recording device 80 is configured by removing the recording unit 33 from the recording device 10 of FIG. 1 and adding a communication unit 37 thereto. Also, the control unit 81 has a configuration in which a transmission control unit 28 and a reception control unit 29 are added to the control unit 20 of FIG. 1. Also, the communication unit 37 has a transmission unit 38 and a reception unit 39. With regard to the recording device 80, the same reference signs are given to the same features as those of the recording device 10, and detailed explanations thereof will not be repeated. The following explanations focus on the features of the recording device 80 different from those of the recording device 10. The recording device 80 may be configured to include the constituent components realized by the control unit 81 in the same or similar manner as in the recording device 10. Specifically, the recording device 80 includes the imaging data acquisition unit 21, the event detection unit 22, the recording control unit 23, the transmission control unit 28, and the reception control unit 29.

Also, the recording device 80 is configured to perform communications with the external recording device 5 via a network. Specifically, the recording device 80 transmits the imaging data imaged using the camera 31 and the microphone 32 to the external recording device 5. In other words, the recording device 80 records the imaging data in the external recording device 5. The external recording device 5 may be a server device such as a cloud server and may be a server device managed by a company or an individual. Alternatively, the external recording device 5 may be a computer device such as a personal computer. The external recording device 5 records the imaging data that has been received via the network.

The sensor 34, which is, for example, an acceleration sensor, may detect an impact or the like occurring in a case where the vehicle incorporating the recording device 80 causes an accident or in a case where it is involved in an accident. Further, the sensor 34 may be configured to detect a speed, etc. of the vehicle. The display unit 35 may be a display device that reproduces the video data recorded in the external recording device 5. The speaker 36 is configured to reproduce the audio data recorded in external recording device 5. The speaker 36 includes an audio amplification unit and a sound processing unit (not shown) before the input of the speaker 36 and the speaker 36 includes these units even when it is only indicated as "speaker 36."

The communication unit 37 is configured to transmit or receive data to or from the external recording device 5. Specifically, the transmission unit 38 transmits data to the external recording device 5 and the reception unit 39 receives the data transmitted from the external recording device 5. The communication unit 37 may be connected to a network using, for example, wireless local area network (LAN) communication scheme. Alternatively, the communication unit 37 may be connected to a network using wireless communication standards such as LTE (Long Term Evolution). The transmission unit 38 performs, for example, modulation processing, etc. on the imaging data that has been output from the control unit 81 and transmits the wireless data that has been generated as a result of the processing to the external recording device 5. Also, the reception unit 39 performs, for example, demodulation processing, etc. on the wireless data that has been transmitted from the external recording device 5 and outputs the imaging data that has been generated as a result of the processing onto the control unit 81. Alternatively, the modulation processing on the imaging data and the demodulation processing on the wireless data may be carried out by the transmission control unit 28 and the reception control unit 29 in the control unit 81.

The recording control unit 23 converts the imaging data stored in the buffer memory 24 into a file and outputs the imaging data in the file format to the transmission control unit 28. The transmission control unit 28 transmits the imaging data via the transmission unit 38 to the external recording device 5. When outputting of the imaging data stored in the buffer memory 24 to the transmission control unit 28 is caused by the event that has been detected by the event detection unit 22, the recording control unit 23 outputs the imaging data acquired from the buffer memory 24 to the transmission control unit 28. The imaging data acquired from the buffer memory 24 includes video data and the audio data. In other words, the recording control unit 23 migrates the imaging data acquired from the buffer memory 24 to the external recording device 5 via the transmission control unit 28 and the transmission unit 38. In other words, the recording control unit 23 records the imaging data acquired from the buffer memory 24 in the external recording device 5. When outputting of the imaging data stored in the buffer memory 24 to the transmission control unit 28 is caused by the event that has been detected by the event detection unit 22, the recording control unit 23 outputs the imaging data acquired from the buffer memory 24 on an as-is basis to the transmission control unit 28. Specifically, the recording control unit 23 generates the moving image file including the video data and the audio data from the imaging data stored in the buffer memory 24 and outputs the moving image file to the transmission control unit 28.

When outputting of the imaging data stored in the buffer memory 24 to the transmission control unit 28 is not caused by the event that has been detected by the event detection unit 22, the recording control unit 23 outputs data that only includes the video data to the transmission control unit 28 among the pieces of the imaging data acquired from the buffer memory 24. That is, the recording control unit 23 outputs the imaging data that includes video data but does not include audio data to the transmission control unit 28. In other words, the recording control unit 23 records the data obtained by erasing audio data from the imaging data from the buffer memory 24 onto the external recording device 5. Specifically, the recording control unit 23 replaces the audio data by soundless audio data for the imaging data stored in the buffer memory 24 to generate a moving image file with the video data, and outputs the moving image file to the transmission control unit 28.

When the recording control unit 23 outputs the imaging data including the video data and the audio data to the transmission control unit 28, then the recording control unit 23 may output imaging data caused by an event, that is, imaging data including video data and audio data to the transmission control unit 28 as overwrite-prohibited data. For example, the recording control unit 23 may designate the address of the memory area in the external recording device 5 where overwriting of data is prohibited so as to output the imaging data to the transmission control unit 28. Alternatively, the recording control unit 23 may specify flag information or the like indicating that overwriting is prohibited in the header or the payload of the imaging data.

Also, when the recording control unit 23 outputs the imaging data that is not caused by an event, i.e., imaging data from which the audio data is erased so that it only includes the video data, to the transmission control unit 28, then the recording control unit 23 may output imaging data that only includes video data to the transmission control unit 28 as overwritable data. For example, the recording control unit 23 may designate the address of the memory area in the external recording device 5 where overwriting of data is allowed and output the imaging data to the transmission control unit 28. Alternatively, the recording control unit 23 may specify flag information indicating that overwriting is allowed in the header or payload of the imaging data.

The reproduction control unit 25 acquires the imaging data recorded in the external recording device 5 and outputs the video data based on the acquired imaging data to the display unit 35, and output the audio data based on the acquired imaging data to the speaker 36, etc. The reception control unit 29 outputs the imaging data output from the reception unit 39 to the reproduction control unit 25. That is, the reproduction control unit 25 receives the imaging data that has been transmitted from the external recording device 5 via the reception unit 39 and the reception control unit 29.

Figure 17:
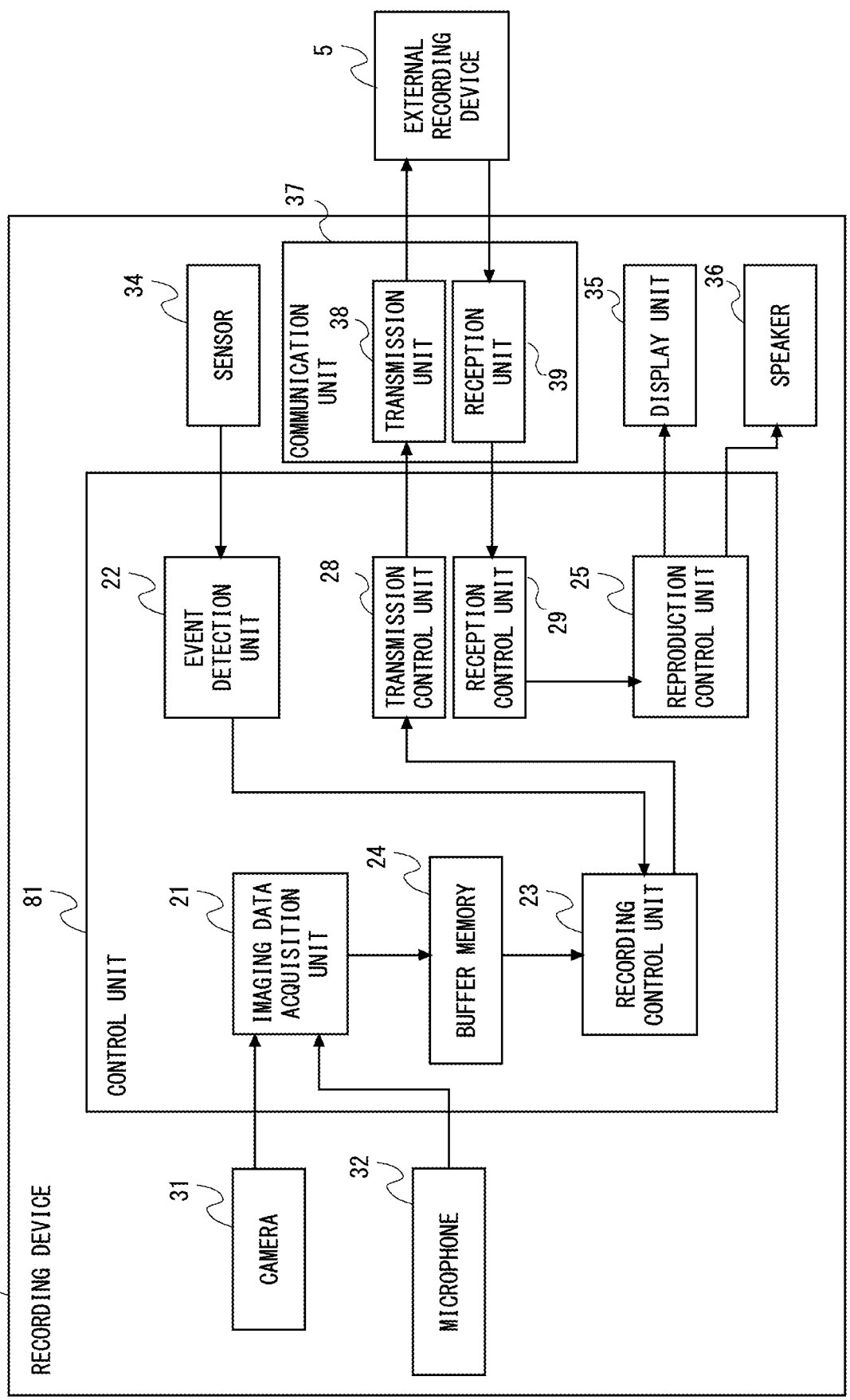
FIG. 17 is a configuration diagram of a recording device according to the tenth embodiment.

While FIG. 17 illustrates a configuration in which the recording device 80 includes the reproduction control unit 25, the reception control unit 29, the display unit 35, and the speaker 36, a reproduction device or the like different than the recording device 80 may include the reproduction control unit 25, the reception control unit 29, the display unit 35, and the speaker 36. In other words, the recording device 80 may not include the reproduction control unit 25, the reception control unit 29, the display unit 35, or the speaker 36. That is, a reproduction device or the like that includes the reproduction control unit 25, the reception control unit 29, the display unit 35, and the speaker 36 may reproduce the data recorded in the external recording device 5. For example, the reproduction device or the like may be a device that reproduces data recorded in a portable recording medium such as an optical disc or a card-type recording medium. The data recorded in the external recording device 5 may be migrated to the portable recording medium.

Figure 18:
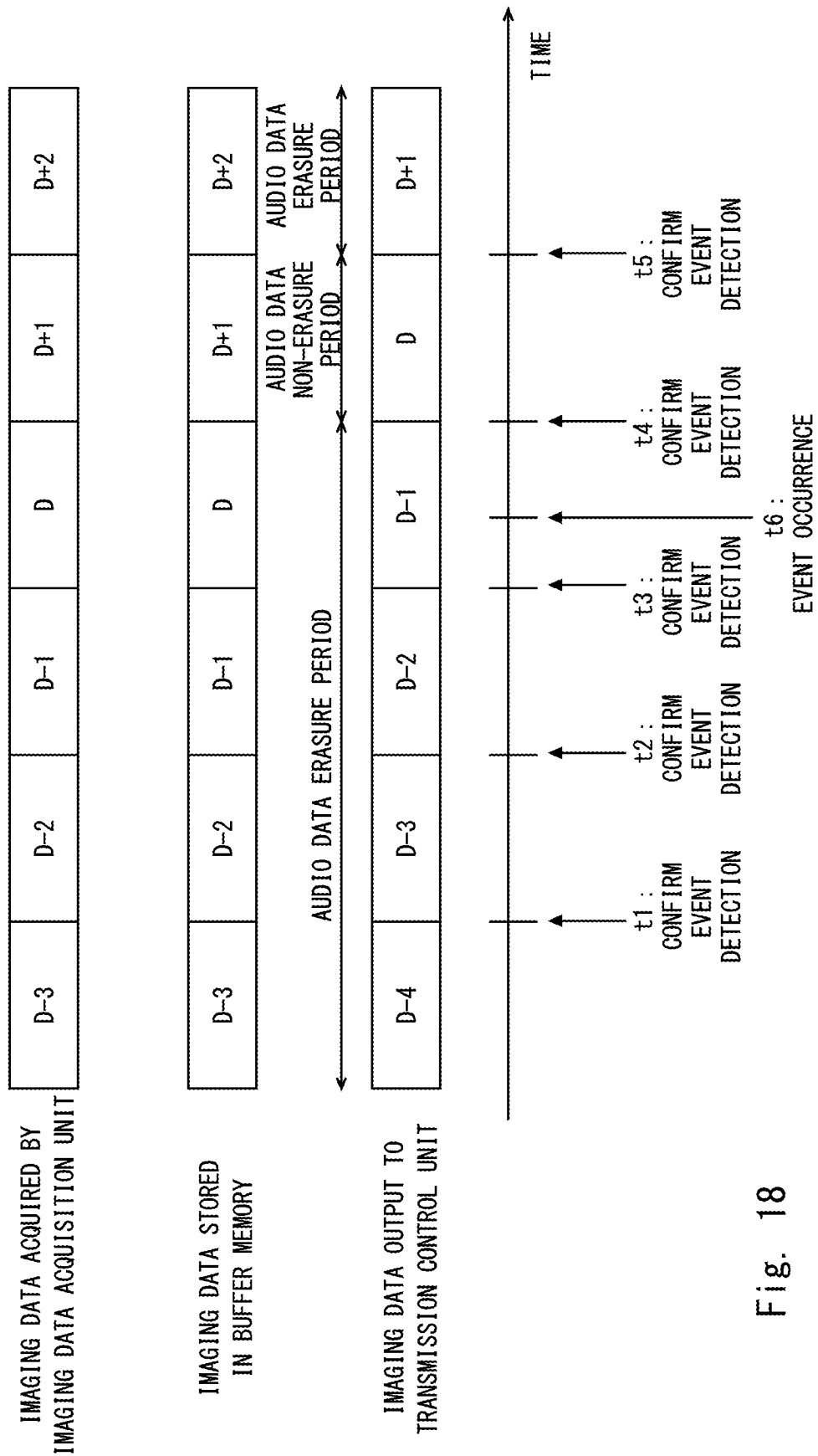
FIG. 18 is a diagram illustrating a relationship between data output to the transmission control unit and data recorded in a buffer memory 24 according to the tenth embodiment.

Here, the relationship between the data output to the transmission control unit 28 and the data recorded in the buffer memory 24 will be described with reference to FIG. 18. The horizontal axis indicated in FIG. 18 indicates the passage of time. Each of D−4 to D+2 indicates a piece of the imaging data imaged in a predetermined period. In FIG. 18, D−4 is the least recently imaged imaging data and D+2 is the most recently imaged imaging data. The predetermined period may be, for example, several seconds, several tens of second, several minutes, and the like.

The imaging data that has been acquired by the imaging data acquisition unit 21 is immediately output to the buffer memory 24. As a result, FIG. 18 illustrates a configuration in which the imaging data that has been acquired by the imaging data acquisition unit 21 is stored on an as-is basis in the buffer memory 24. In other words, FIG. 18 illustrates a configuration in which the particular point of time at which the imaging data acquisition unit 21 acquired the imaging data and the particular point of time at which the imaging data is stored in the buffer memory 24 are substantially in agreement with each other. The substantial agreement in this context means may also include a case where the particular point of time at which the imaging data acquisition unit 21 acquired the imaging data is not completely in agreement with the particular point of time at which the imaging data is stored in the buffer memory 24. For example, the substantial agreement may encompass a case where the particular point of time at which the imaging data is stored in the buffer memory 24 may be delayed relative to the particular point of time at which the imaging data acquisition unit 21 acquired the imaging data. Meanwhile, the imaging data output to the transmission control unit 28 is temporarily stored in the buffer memory 24 and subsequently output to the transmission control unit 28 by the recording control unit 23. As a result, the particular point of time at which the imaging data acquired by the imaging data acquisition unit 21 is stored in the buffer memory 24 is different from the particular point of time at which it is output to the transmission control unit 28. Specifically, the particular point of time at which the imaging data is output to the transmission control unit 28 is later than the particular point of time at which the imaging data is stored in the buffer memory 24.

t1 to t6 indicate the time. The recording control unit 23 determines whether or not an event occurred in the past predetermined periods at the time t1 to the time t6. For example, the recording control unit 23 determines, at the time t2, whether or not an event occurred in the period from the time t1 to the time t2. The recording control unit 23 likewise determines, at other time points, whether or not an event occurred. In FIG. 2, the recording control unit 23 at the time t1 to the time t3 and at the time t5, determines that no event has occurred. Also, the recording control unit 23 at the time t4 determines that an event has occurred at the time t6 in a period from the time t3 to the time t4.

When the recording control unit 23 has determined, for example, at the time t2, that no event has occurred in the period from the time t1 to the time t2, the recording control unit 23 erases the audio data from the imaging data D−2 stored in the buffer memory 24, in other words, makes the audio data of the imaging data D−2 soundless, converts the imaging data which now includes only the video data into a file and outputs it to the transmission control unit 28. On the other hand, the recording control unit 23 determines at the time t4 that the event occurred at the time t6 in the period from the time t3 to the time t4. In this case, the recording control unit 23, converts the data D stored in the buffer memory 24 into a file on an as-is basis without erasing audio data from the data D acquired at the time t6 by the imaging data acquisition unit 21, and outputs it to the transmission control unit 28.

While FIG. 18 illustrates a configuration in which the imaging data storing of which is completed to the buffer memory 24 is instantaneously output to the transmission control unit 28, the particular point of time at which the imaging data recorded in the buffer memory 24 is output to the transmission control unit 28 is not limited to the one illustrated in FIG. 18. For example, the recording control unit 23 may acquire the imaging data that is being stored into the buffer memory 24 and output the acquired imaging data to the transmission control unit 28. Alternatively, when storing of the imaging data into the buffer memory 24 has been completed, the recording control unit 23 may output the same imaging data to the transmission control unit 28 after a lapse of a predetermined period after the time point at which the storing of the imaging data was completed. Here, it is intended that the imaging data corresponds to any one of D−4 to D+2 illustrated in FIG. 18.

Also, FIG. 18 illustrates a configuration in which the recording control unit 23 outputs only the imaging data acquired by the imaging data acquisition unit 21 in a period including the time point at which the event occurred without erasing the audio data to the transmission control unit 28. The recording control unit 23 is not limited to this and, for example, may output a piece of imaging data acquired by the imaging data acquisition unit 21 in a period prior to the period including the time point at which the event occurred without erasing the audio data to the transmission control unit 28 in addition to the imaging data acquired by the imaging data acquisition unit 21 in a period including the time point at which the event occurred. For example, the recording control unit 23 may output, at the time t6, data D−1 to the transmission control unit 28 without erasing audio data in addition to the data D acquired by the imaging data acquisition unit 21.

Also, even in a case where the recording control unit 23 determines that no event has occurred, the recording control unit 23 may output to the transmission control unit 28 the imaging data acquired in a period prior to the latest period with its audio data erased in addition to the imaging data acquired in the latest period stored in the buffer memory 24.

In FIG. 18, the period in which data D−4 to data D−1 are output to the transmission control unit 28 and the period in which data D+1 is output are defined as audio data erasure period and the period in which data D is output to the transmission control unit 28 is defined as an audio data non-erasure period.

Next, the flow of the transmission processing for transmitting imaging data according to the tenth embodiment will be described with reference to FIG. 19. First, the imaging data acquisition unit 21 outputs the imaging data including the video data and the audio data to the buffer memory 24 and the buffer memory 24 starts storing of the imaging data (S101). Next, the recording control unit 23, in starting outputting of the imaging data stored in the buffer memory 24 to the transmission control unit 28, determines whether or not an event has occurred (S102). Specifically, the recording control unit 23 determines whether or not an event occurred in a period of imaging of the imaging data to be output to the transmission control unit 28. For example, the recording control unit 23 determines whether or not occurrence of an event has been detected by the event detection unit 22 in a period of imaging of the imaging data to be output to the transmission control unit 28.

The recording control unit 23 outputs the imaging data whose period of imaging includes the particular point of time at which the event occurred to the transmission control unit 28 (S103). The transmission control unit 28 transmits the output imaging data to the external recording device 5 via the transmission unit 38. The imaging data output in the step S13 is a moving image file that includes the video data and the audio data. In other words, the recording control unit 23 converts the imaging data stored in the buffer memory 24 into a file without erasing the audio data therefrom and outputs the imaging data to the transmission control unit 28.

When the recording control unit 23 determines that no event has occurred, the recording control unit 23 erases the audio data from the imaging data imaged in a period in which no event occurred and outputs the imaging data that only includes the video data to the transmission control unit 28 (S104). The imaging data output in the step S104 is a moving image file that includes video data and audio data that is made to be soundless. In other words, the recording control unit 23 erases audio data from the imaging data stored in the buffer memory 24 and converts it into a file and outputs the imaging data to the transmission control unit 28. The transmission control unit 28 transmits the output imaging data to the external recording device 5 via the transmission unit 38.

The recording control unit 23, after having output the imaging data stored in the buffer memory 24 to the transmission control unit 28 in the step S103 or S104, determines whether or not outputting of the imaging data in a predetermined period has been completed (S105). The predetermined period may be the period of imaging of the respective pieces of imaging data D−4 to D+2 described in FIG. 18. For example, the recording control unit 23 may determine whether or not a piece of imaging data D−2 that is not output to the transmission control unit 28 remains to exist in the buffer memory 24 while the imaging data D−2 is being output to the transmission control unit 28. When the recording control unit 23 determines that the imaging data D−2 that is not output to the transmission control unit 28 does not remain to exist in the buffer memory 24, then the recording control unit 23 may determine that the outputting of the imaging data in a predetermined period has been completed. When the recording control unit 23 determines that the imaging data D−2 that is not output to the transmission control unit 28 remains to exist in the buffer memory 24, then the recording control unit 23 continues outputting of the imaging data D−2.

Next, the recording control unit 23 determines whether or not outputting of all the pieces of imaging data stored in the buffer memory 24 has been completed (S106). When the recording control unit 23 determines that the outputting of all the pieces of imaging data stored in the buffer memory 24 has been completed, then the recording control unit 23 terminates the processing. The case where no imaging data that is not output to the transmission control unit 28 exists in the buffer memory 24 may include, for example, a case where the driver performed an operation to stop the imaging, a case where the engine has stopped and the imaging has been stopped, and other cases.

When the recording control unit 23 determines that outputting of all the pieces of imaging data that were stored in the buffer memory 24 has not been completed, the recording control unit 23 repeatedly carries out the processing steps of the step S101 and the subsequent steps.

As described in the foregoing, the recording device 80 according to the tenth embodiment can transmit video data and the audio data to the external recording device 5 for the imaging data whose imaging period includes the particular point of time at which the event occurred. Also, with regard to the imaging data imaged in a period in which no event has occurred, the recording device 80 can erase the audio data from the imaging data and transmit only the video data to the external recording device 5. The video data transmitted to the external recording device 5 is stored by the external recording device. By virtue of this, the recording device 80 makes it possible for the imaging data at the time of occurrence of an event such as a traffic accident to contribute to identification of the cause of the accident because the imaging data includes the video data and the audio data. On the other hand, the recording device 80 erases audio data that may include speeches of a drivers or conversations between the driver and the passenger and the like from the imaging data in the period in which no event has occurred and thus can protect the privacy of the driver and the passenger.

Also, since the imaging data is recorded in the external recording device 5, it is made possible to prevent corruption and loss of the imaging data even when the vehicle or drive recorder is damaged due to the accident or the like.

Eleventh Embodiment

Next, the flow of the transmission processing for transmitting the imaging data according to the eleventh embodiment will be described with reference to FIG. 20. FIG. 20 focuses on illustration of the processes different from those in FIG. 19.

Figure 19:
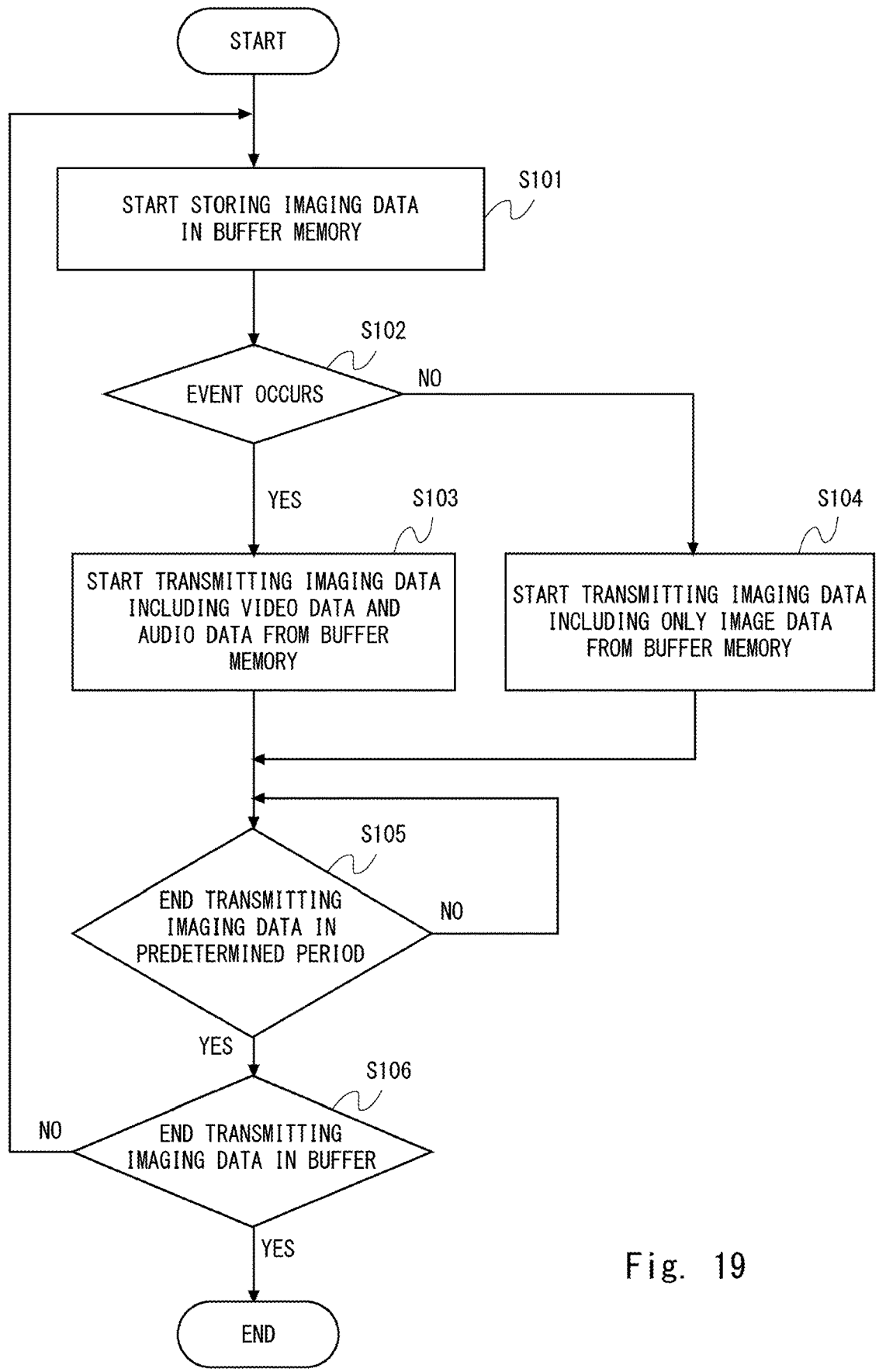
FIG. 19 is a diagram illustrating a flow of transmission processing to transmit imaging data according to the tenth embodiment.
Figure 20:
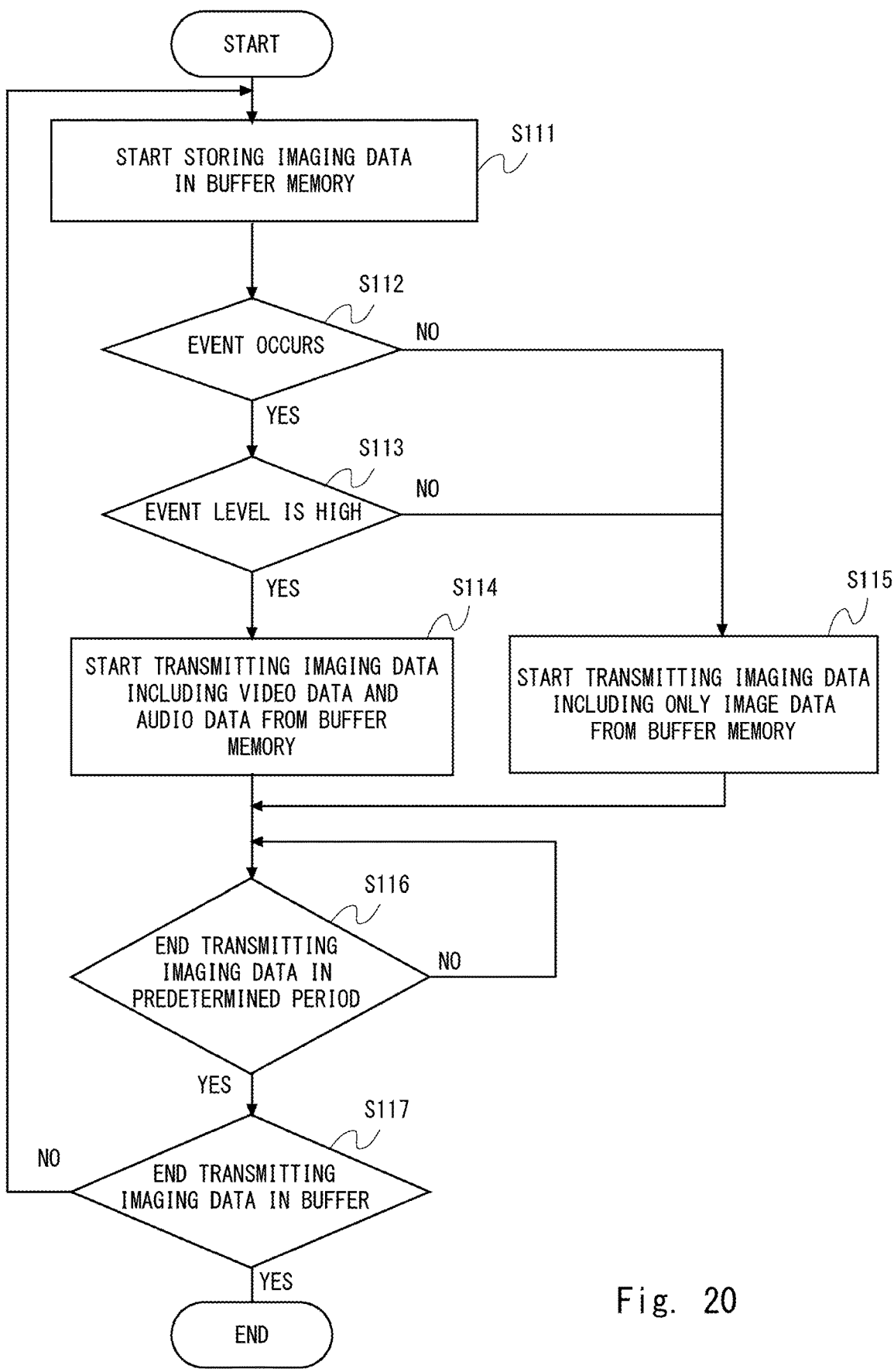
FIG. 20 is a diagram illustrating a flow of transmission processing to transmit imaging data according to the eleventh embodiment.

Since the step S111 is the same as or similar to the step S101 of FIG. 19, detailed explanations thereof will not be repeated. Next, the recording control unit 23 determines whether or not an event has occurred at the start of outputting of the imaging data stored in the buffer memory 24 to the transmission control unit 28 (S112).

Here, the event that is detected by the event detection unit 22 is described in detail with reference to FIG. 21. The information acquired by the event detection unit 22 or a device that detect the same information is described in the SENSING column in FIG. 21. The acceleration sensor detects acceleration information or impact information of the vehicle and outputs it to the event detection unit 22. The user operation refers to operation of the recording device 80 by the user and reception of the operation to manually start the recording caused by an event without relying on the sensor, etc. The steering information is information on steering wheel operation by the driver acquired, for example, via a CAN network. The speed information is speed information of the vehicle acquired, for example, by a CAN network. The volume is, for example, information indicative of the sound level of the user of the vehicle.

In the EVENT column, an example of an event determined on the basis of the information acquired by the event detection unit 22 or the like is described. For example, when the acceleration detected by the acceleration sensor is equal to or larger than the threshold 1 and equal to or larger than the threshold 2 indicative of a collision, then the event detection unit 22 determines that the vehicle has collided with a human or an object. The threshold 2 is defined to be a value larger than the threshold 1. Alternatively, when the waveform of the acceleration is the one that indicates a collision, the event detection unit 22 may determine that the vehicle has collided with a human or an object. Also, when the acceleration detected by the acceleration sensor is equal to or larger than the threshold 1 and lower than the threshold 2, then the event detection unit 22 determines that the vehicle has made sudden acceleration or sudden deceleration. Alternatively, when the waveform of the acceleration is not the one that indicates a collision, the event detection unit 22 may determine that the vehicle has made sudden acceleration or sudden deceleration. Also, the event detection unit 22 detects operation of the operation unit of the recording device 80 and an instruction to start recording caused by an event. Also, in a case where the speed of rotation of the steering wheel exceeds a predetermined value, in a case where the amount of rotation of the steering wheel exceeds a predetermined value, or in other cases, the event detection unit 22 determines that the driver has turned the steering wheel suddenly. Also, when the speed of the vehicle exceeds a predetermined value, the event detection unit 22 determines that the vehicle is in a state of overspeed. Also, when the sound level of the user of the vehicle exceeds a predetermined value, the event detection unit 22 determines that a human trouble has occurred in the vehicle.

In the EVENT LEVEL column, the levels of the individual events are described. For example, an event level of an event such as collision and human trouble are set to high and the event levels of other events are set to low. The recording control unit 23 determines the type of the imaging data to be transmitted to the external recording device 5 on the basis of the event level.

In the TRANSMISSION DATA column, the data which the recording control unit 23 transmits to the external recording device 5 via the transmission control unit 28 and the transmission unit 38 is described. For example, when the event level is set to high, then the recording control unit 23 transmits the video data and the audio data. Also, when the event level is set to low, then the recording control unit 23 transmits only the video data. Also, when the event detection unit 22 determined the event using the information detected by the acceleration sensor, then the recording control unit 23 may additionally transmit the acceleration information. Further, when the event detection unit 22 has determined the event using the speed information, then the recording control unit 23 may additionally transmit the speed information.

Referring back to FIG. 20, when occurrence of an event has been notified from the event detection unit 22, the recording control unit 23 determines whether or not the event level is high (S113). When the event detection unit 22 has detected the event, the event detection unit 22 notifies the content of the event described in the EVENT column of FIG. 21 and its event level to the recording control unit 23. When the recording control unit 23 has determined that the event level is high, the recording control unit 23 outputs the imaging data whose imaging period includes the particular point of time at which the event with its event level set to high occurred to the transmission control unit 28 (S114). The imaging data output in the step S114 is a moving image file including the video data and the audio data.

When occurrence of an event has not been notified from the event detection unit 22 and the recording control unit 23 has determined in the step S112 that no event occurred and determined in the step S113 that the event level of the event that occurred is not high, then the recording control unit 23 carries out the processing defined at the step S115. In the step S115, the recording control unit 23 erases the audio data from the imaging data imaged in a period where no event occurred, or the imaging data including the particular point of time at which the event occurred, and outputs the imaging data that only includes the video data to the transmission control unit 28.

Since the steps S116 and S117 are the same as or similar to the steps S105 and S106 of FIG. 19, detailed explanations thereof will not be repeated.

As described in the foregoing, the recording device 80 according to the eleventh embodiment can determine, in accordance with the event level of the event that occurred, whether the video data and the audio data should be transmitted to the external recording device 5 or only the video data should be transmitted to the external recording device 5. For both of the high and low event levels, the flag information is specified that indicates prohibition of overwriting as the imaging data caused by the event. Also, with regard to the data recorded by the external recording device 5, the imaging data that is not caused by an event is recorded in an overwritable manner without including the audio data; and with regard to the imaging data caused by the event, if the event level is high, then audio data and video data are recorded; and if the event level is low, then the imaging data is recorded without the audio data included therein. By virtue of this, among the pieces of imaging data that have been transmitted from the recording device 80 to the external recording device 5 to be recorded as overwrite-prohibited data, the video data recording occurrence of an accident or a trouble is recorded as data whose audio data can be referred to in addition to the video data for the purpose of identification of the cause of the accident or the trouble, and the video data recording the operation state of the vehicle or the like is recorded without its audio data included therein, so that it is made possible to protect privacy of the driver and the passenger in relation to the imaging data whose recording is caused by an event.

Twelfth Embodiment

Next, an example of a configuration of a recording device 90 according to the twelfth embodiment will be described with reference to FIG. 22. The recording device 90 has a control unit 91 instead of the control unit 81 of the recording device 80 of FIG. 17. Also, the control unit 91 has a configuration in which a volume level acquisition unit 92 is added to the control unit 81 of FIG. 17. The same reference signs are given to the same features of recording device 90 as those of the recording device 80, and detailed explanations thereof will not be repeated. The following explanations focus on the features of the recording device 90 different from those of the recording device 80. The recording device 90 may be configured to include the constituent components realized by the control unit 91 in the same or similar manner as the recording device 80. Specifically, the recording device 90 includes the imaging data acquisition unit 21, the event detection unit 22, the recording control unit 23, the transmission control unit 28, and the volume level acquisition unit 92.

The volume level acquisition unit 92 acquires the information on the volume level from the audio data generated by the microphone 32. The volume level acquisition unit 42 may acquire the information on the volume level from the audio data acquired by the imaging data acquisition unit 21. The volume level may be information indicative of the volume of, for example, a sound. The volume level acquisition unit 42 outputs the information on the volume level to the event detection unit 22. Specifically, the information on the volume level may include the identification information to identify the audio data.

Figure 22:
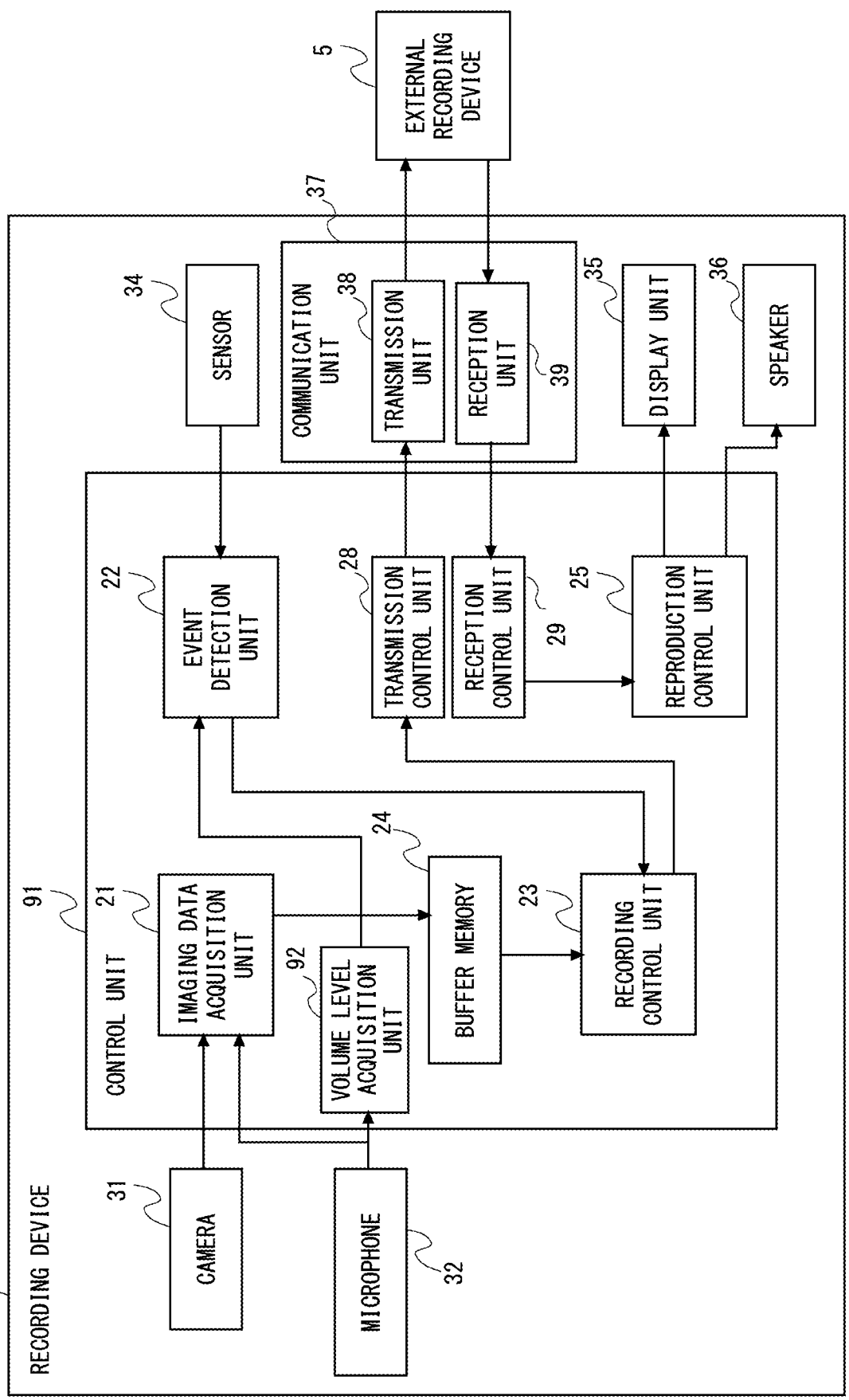
FIG. 22 is a configuration diagram of a recording device according to the twelfth embodiment.

While FIG. 22 illustrates a configuration in which the volume level acquisition unit 92 is arranged between the microphone 32 and the event detection unit 22, the volume level acquisition unit 42 may be arranged between the imaging data acquisition unit 21 and the event detection unit 22.

The recording control unit 23 determines whether or not the audio data should be erased from the imaging data in accordance with the volume level regarding the audio data. For example, the threshold 1 for the volume level is defined between the volume at a level of normal conversation and a loud voice above the level of normal conversation. That is, the threshold 1 is used to identify the normal conversation level and volume levels equal to or higher than that. The loud voice above the level of normal conversation may be, for example, a human scream or shouting voice, etc. The volume level exceeding the threshold 1 indicates occurrence of the human trouble illustrated in FIG. 21. That is, when the volume level exceeds the threshold 1, the occurrence of the human trouble is detected by the event detection unit 22 and the event level is set to high.

If the volume level is lower than the threshold 1, the recording control unit 23 erases the audio data from the imaging data and transmits only the video data to the external recording device 5. That is, if the volume level is lower than the threshold 1, no event is detected.

Since the recording control unit 23 determines whether or not the audio data should be erased from the imaging data on the basis of the threshold 1, privacy of the driver or the passenger can be protected.

Next, the flow of the transmission processing to transmit the imaging data according to the twelfth embodiment will be described. Since the transmission processing to transmit the imaging data according to the twelfth embodiment is the same as or similar to that of FIG. 20, the flow of the transmission processing to transmit the imaging data according to the twelfth embodiment will be described with reference to FIG. 20. The transmission processing to transmit the imaging data according to the twelfth embodiment is processing that proceeds mainly in accordance with the volume level. The content related to the processing using the volume level in FIG. 20 will be described below.

In the step S112, the recording control unit 23 determines whether or not an event associated with human trouble has been notified from the event detection unit 22. Specifically, the event detection unit 22 determines whether or not a volume level exceeding the threshold 1 has been acquired from the volume level acquisition unit 92. When the volume level acquired by the volume level acquisition unit 92 exceeds the threshold 1, the event detection unit 22 notifies the occurrence of the event associated with human trouble to the recording control unit 23. When the volume level acquired by the volume level acquisition unit 92 is lower than the threshold 1, the event detection unit 22 determines that no event associated with human trouble has occurred.

Further, in the step S113, the recording control unit 23 determines whether or not the event level of the event notified from the event detection unit 22 is high. As illustrated in FIG. 21, the event level of the event associated with human trouble is set to high. As a result, when the recording control unit 23 in the step S112 is notified about the occurrence of a human trouble, the recording control unit 23 determines that the event level is high. Also, when the event detection unit 22 has multiple thresholds regarding the volume level, the event detection unit 22 may set the event levels regarding the human trouble to high or low in accordance with the volume level. In such a case, the recording control unit 23 determines in the step S112 that a human trouble has occurred as an event and, in the step S113, may determine that the event level is not high.

Since the processing steps other than the steps S112 and S113 are the same as or similar to those that have already been described, detailed explanations thereof will not be repeated.

As described in the foregoing, by using the recording device 90 according to the twelfth embodiment, it is made possible to determine whether or not the audio data should be erased from the imaging data in accordance with the volume level. By virtue of this, if the volume level falls within the range that would not correspond to a human trouble, it is made possible to provide records that do not include audio data and thereby ensure privacy.

In the above-described example, the program can be stored using various types of non-transitory computer readable media and supplied to a computer. Non-transitory computer readable media include various types of tangible storage media. Examples of non-transitory computer readable media include a magnetic recording medium (e.g., a flexible disc, a magnetic tape, and a hard disk drive), a magneto-optical recording medium (e.g., a magneto-optical disc), a read only memory (CD-ROM) unit, a CD-R unit, a CD-R/W unit, semiconductor memory unit (e.g., a mask ROM unit, a programmable ROM (PROM) unit, an erasable PROM (EPROM) unit, a flash ROM unit, and a random access memory (RAM) unit). Also, the program may be supplied to the computer by various types of transitory computer readable media. Examples of transitory computer readable media include electrical signals, optical signals, and electromagnetic waves. A transitory computer readable medium can supply a program to a computer via a wired communication channel such as an electrical wire and an optical fiber, or a wireless communication channel.

It should be noted that the present disclosure is not limited to the above-described embodiments and can be appropriately modified as long as its scope is not deviated from.

The present application can be adopted to a recording device that records imaging data.

What is claimed is:

1. A recording device comprising:
an imaging data acquisition unit configured to acquire imaging data including video data and audio data, the imaging data imaging an inside of a vehicle or an outside of the vehicle;
an event detection unit configured to detect occurrence of an event for the vehicle;
a speech analysis unit configured to determine whether or not the speech of a driver or a passenger of the vehicle is included in the audio data included in the imaging data acquired by the imaging data acquisition unit; and
a recording control unit configured to:
record first imaging data including the video data and the audio data in a recording unit when recording of the imaging data in the recording unit is caused by the event detected by the event detection unit,
record second imaging data including the video data and not including the audio data in the recording unit when (i) recording of the imaging data in the recording unit is not caused by the event and (ii) speech of the driver or the passenger is included in the audio data, and
record the first imaging data including the video data and the audio data in a recording unit when recording of the imaging data in the recording unit is not caused by the event and speech of the driver or the passenger is not included in the audio data.

2. The recording device according to claim 1, further comprising a buffer memory configured to temporarily store the imaging data acquired by the imaging data acquisition unit, wherein
the recording control unit is configured to
migrate the first imaging data obtained by not erasing the audio data from the imaging data to the recording unit when migrating the imaging data from the buffer memory to the recording unit is caused by the event detected by the event detection unit, and
migrate the second imaging data obtained by erasing the audio data from the imaging data to the recording unit when migrating the imaging data from the buffer memory to the recording unit is not caused by the event detected by the event detection unit.

3. The recording device according to claim 1, further comprising a passenger detection unit configured to detect presence or absence of a passenger in a vehicle to which the recording device is mounted, wherein
the recording control unit is configured to
record the first imaging data in the recording unit when recording of the imaging data in the recording unit is caused by the event detected by the event detection unit, and
record the second imaging data in the recording unit when recording of the imaging data in the recording unit is not caused by the event detected by the event detection unit and the passenger is detected.

4. The recording device according to claim 1, wherein the recording control unit is configured to record the first imaging data in a recording unit as overwrite-prohibited data, and record the second imaging data in the recording unit as overwritable data.

5. The recording device according to claim 1, wherein the event detection unit is configured to acquire acceleration information indicative of an acceleration acting on the recording device and detects occurrence of an event when the acceleration indicated by the acceleration information is equal to or larger than a predetermined value.

6. A recording method in a recording device comprising:
acquiring imaging data including video data and audio data, the imaging data imaging an inside of a vehicle or an outside of the vehicle;
detecting occurrence of an event for the vehicle;
determining whether or not the speech of a driver or a passenger of the vehicle is included in the audio data included in the imaging data;
recording first imaging data including the video data and the audio data in a recording unit when recording of the imaging data in the recording unit is caused by the event detected;
recording second imaging data including the video data and not including the audio data in the recording unit when (i) recording of the imaging data is not caused by the event and (ii) speech of the driver or the passenger is included in the audio data; and
recording the first imaging data including the video data and the audio data in a recording unit when recording of the imaging data in the recording unit is not caused by the event and speech of the driver or the passenger is not included in the audio data.

7. A non-transitory computer readable medium storing a program for causing a computer to execute the following processing of:
acquiring imaging data including video data and audio data, the imaging data imaging an inside of a vehicle or an outside of the vehicle;
detecting occurrence of an event for the vehicle;
determining whether or not the speech of a driver or a passenger of the vehicle is included in the audio data included in the imaging data;
recording first imaging data including the video data and the audio data in a recording unit when recording of the imaging data in the recording unit is caused by the event detected; and
recording second imaging data including the video data and not including the audio data in the recording unit when (i) recording of the imaging data is not caused by the event and (ii) speech of the driver or the passenger is included in the audio data; and recording the first imaging data including the video data and the audio data in a recording unit when recording of the imaging data in the recording unit is not caused by the event and speech of the driver or the passenger is not included in the audio data.

* * * * *